US011888239B2

(12) United States Patent
Hsu et al.

(10) Patent No.: US 11,888,239 B2
(45) Date of Patent: Jan. 30, 2024

(54) ANTENNA APPARATUS AND ELECTRONIC DEVICE

(71) Applicant: Huawei Technologies Co., Ltd., Shenzhen (CN)

(72) Inventors: Chih-Wei Hsu, Taipei (CN); Dong Yu, Shanghai (CN); Hangfei Tang, Shanghai (CN); Zhiyuan Xie, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 17/432,826

(22) PCT Filed: Feb. 7, 2020

(86) PCT No.: PCT/CN2020/074486
§ 371 (c)(1),
(2) Date: Aug. 20, 2021

(87) PCT Pub. No.: WO2020/168926
PCT Pub. Date: Aug. 27, 2020

(65) Prior Publication Data
US 2022/0123469 A1 Apr. 21, 2022

(30) Foreign Application Priority Data
Feb. 22, 2019 (CN) ......................... 201910136437.0

(51) Int. Cl.
*H01Q 5/392* (2015.01)
*H01Q 1/24* (2006.01)
(Continued)

(52) U.S. Cl.
CPC ............. *H01Q 5/392* (2015.01); *H01Q 1/243* (2013.01); *H01Q 1/36* (2013.01); *H01Q 1/44* (2013.01);
(Continued)

(58) Field of Classification Search
CPC ............ H01Q 1/243; H01Q 9/42; H01Q 1/22; H01Q 5/328; H01Q 13/10; H01Q 1/24;
(Continued)

(56) References Cited

U.S. PATENT DOCUMENTS 8,060,167 B2 * 11/2011 Saitou .................... H01Q 23/00 455/575.3
9,864,410 B2 * 1/2018 La ......................... G06F 1/1652
(Continued)

FOREIGN PATENT DOCUMENTS

CN 102800931 A 11/2012
CN 107465433 A 12/2017
(Continued)

OTHER PUBLICATIONS

Yan Yan et al, The Development of Wearable Technologies, vol. 34, No. 6, Dec. 2015, 10 pages.

*Primary Examiner* — Vibol Tan
(74) *Attorney, Agent, or Firm* — Conley Rose, P.C.

(57) ABSTRACT

An antenna apparatus used in an electronic device having a flexible display that can be bent at a rotating shaft and that includes a primary screen and a secondary screen respectively configured on two sides of the rotating shaft. The antenna apparatus includes a first metal strip disposed on the primary screen frame close to one end of the rotating shaft, and a second metal strip disposed on the secondary screen frame close to the same end of the rotating shaft. The first metal strip is implemented as a plurality of antennas through dual-feed design. When the flexible display is in a folded state, the second metal strip is coupled to the first metal strip to generate radiation and is used as a parasitic antenna of the first metal strip.

20 Claims, 19 Drawing Sheets

(51) Int. Cl.

| | |
|---|---|
| ***H01Q 5/10*** | (2015.01) |
| ***H01Q 5/28*** | (2015.01) |
| ***H01Q 5/328*** | (2015.01) |
| ***H01Q 1/36*** | (2006.01) |
| ***H01Q 1/44*** | (2006.01) |

(52) U.S. Cl.
CPC ................. *H01Q 5/10* (2015.01); *H01Q 5/28* (2015.01); *H01Q 5/328* (2015.01)

(58) Field of Classification Search
CPC ............ H01Q 5/10; H01Q 1/242; H01Q 5/50; H01Q 1/2291; H01Q 5/392; H01Q 1/36; H01Q 1/44; H01Q 5/28; H01Q 7/00; H01Q 1/2258; H01Q 1/50; H01Q 5/307; G06F 1/1652; G06F 1/1616; G06F 1/1681; G06F 1/1641; H04M 1/0214; H04M 1/0202; H04M 1/0216; F16C 11/04
See application file for complete search history.

(56) References Cited

U.S. PATENT DOCUMENTS

| | | | | |
|---|---|---|---|---|
| 10,015,897 | B1 | 7/2018 | Hong et al. | |
| 10,310,551 | B2 * | 6/2019 | Bae | G06F 1/1616 |
| 11,011,837 | B2 * | 5/2021 | Wu | H01Q 21/28 |
| 11,056,768 | B2 * | 7/2021 | Kim | H01Q 21/00 |
| 2002/0113741 | A1 | 8/2002 | Asano et al. | |
| 2015/0171916 | A1 | 6/2015 | Asrani et al. | |
| 2018/0332152 | A1 | 11/2018 | Hosoi et al. | |
| 2018/0366813 | A1 | 12/2018 | Kim et al. | |
| 2020/0058992 | A1 | 2/2020 | Wu et al. | |
| 2020/0186629 | A1 | 6/2020 | He et al. | |
| 2021/0318720 | A1 | 10/2021 | Lin et al. | |

FOREIGN PATENT DOCUMENTS

| | | | |
|---|---|---|---|
| CN | 108292796 | A | 7/2018 |
| CN | 108879072 | A | 11/2018 |
| CN | 109167151 | A | 1/2019 |
| CN | 109167153 | A | 1/2019 |
| CN | 109167154 | A | 1/2019 |
| CN | 109216876 | A | 1/2019 |
| CN | 109361062 | A | 2/2019 |
| EP | 1555716 | A1 | 7/2005 |
| EP | 3439103 | A1 | 2/2019 |
| EP | 3890106 | A1 | 10/2021 |
| HK | 3439103 | A1 | 2/2019 |
| JP | 2002217800 | A | 8/2002 |
| JP | 2006115419 | A | 4/2006 |
| JP | 2019537909 | A | 12/2019 |
| WO | 2005029638 | A1 | 3/2005 |
| WO | 2018009095 | A1 | 1/2018 |
| WO | 2018090295 | A1 | 5/2018 |
| WO | 2020135150 | A1 | 7/2020 |

* cited by examiner

Folded state (top view)

Open state (top view)

ANTENNA APPARATUS AND ELECTRONIC DEVICE

CROSS-REFERENCE TO RELATED APPLICATIONS

This application is a National Stage of International Patent Application No. PCT/CN2020/074486 filed on Feb. 7, 2020, which claims priority to Chinese Patent Application No. 201910136437.0 filed on Feb. 22, 2019. Both of the aforementioned applications are hereby incorporated by reference in their entireties.

This application claims priority to Chinese Patent Application No. 201910136437.0, filed with China National Intellectual Property Administration on Feb. 22, 2019 and entitled "ANTENNA APPARATUS AND ELECTRONIC DEVICE", which is incorporated herein by reference in its entirety.

TECHNICAL FIELD

The present invention relates to the field of antenna technologies, and in particular, to an antenna apparatus used in an electronic device.

BACKGROUND

With development of mobile communications technologies and popularization of smartphones, design of smartphones evolves from large screens, bezel-less screens, revolvable screens, and the like to foldable screens for better user experience and novel appearances and functions. This evolution depends on development of flexible display technologies. Foldable screens of electronic devices such as smartphones bring new possibilities for functional design of the electronic devices, and are applicable to and cover more new application scenarios. In addition, the foldable screens also bring new challenges and new possibilities for antenna design of the electronic devices.

SUMMARY

Embodiments of the present invention provide an antenna apparatus. Based on a flexible display architecture of an electronic device, a second metal strip disposed on a secondary screen frame can be effectively used, to improve radiation efficiency of a first metal strip disposed on a primary screen frame, optimize antenna performance of the first metal strip when a flexible display is in a folded state, and reduce a difference between the antenna performance in the folded state of the flexible display and antenna performance in an open state of the flexible display.

According to a first aspect, this application provides an antenna apparatus used in an electronic device. The electronic device may include: a flexible display, a rotating shaft, and a frame. The flexible display may include: a primary screen and a secondary screen. The primary screen and the secondary screen are connected by using the rotating shaft. A width of the primary screen and a width (w2) of the secondary screen may be the same or different. A frame of the electronic device may include a primary screen frame and a secondary screen frame. In this application, the primary screen may be referred to as a first screen and the secondary screen may be referred to as a second screen. The flexible display can be bent at the rotating shaft. Herein, being bent may include that the flexible display is bent outwardly or the flexible display is bent inwardly.

The antenna apparatus may include: a first metal strip and a second metal strip. Two ends of the first metal strip are open and may include a first open end and a second open end. The first metal strip may have a first feed point close to the first open end and a second feed point close to the second open end. The first feed point may be connected to a matching circuit of a first antenna (for example, a diversity antenna), and the second feed point may be connected to a matching circuit of a second antenna (for example, a GPS antenna). A first ground point may be disposed on the first metal strip and between the first feed point and the second feed point. One end of the second metal strip is open and the other end of the second metal strip is grounded. A first connection point may be disposed on the second metal strip, and the first connection point is connected to a first filter. An operating band of the first filter may include a radiation band (for example, a low band) of the first antenna and a radiation band (for example, a GPS band) of the second antenna. The first metal strip may be disposed on the first screen frame close to a first end of the rotating shaft. The second metal strip may be disposed on the second screen frame close to the first end of the rotating shaft. When the flexible display is in the folded state, the first metal strip may be coupled to the second metal strip to generate radiation in the radiation band of the first antenna. In this way, antenna performance of the first metal strip in the radiation band (for example, a low band) of the first antenna and the radiation band (for example, a GPS band) of the second antenna can be improved. In this case, the second metal strip may be used as a parasitic structure of the first metal strip.

The antenna apparatus provided in the first aspect is implemented, so that the second metal strip disposed on the secondary screen frame can be effectively used. Because the first filter is disposed on the second metal strip on the secondary screen frame, when the flexible display is in the folded state, radiation efficiency of the first metal strip disposed on the primary screen frame is improved, antenna performance of the first metal strip when the flexible display is in the folded state is optimized, and a difference between antenna performance in the folded state of the flexible display and antenna performance in an open state of the flexible display is reduced.

With reference to the first aspect, in some optional embodiments, a second filter may be further disposed on a side that is of the first metal strip and that is close to the first open end. The second filter may be presented as a grounded bandpass in the radiation band (for example, a GPS band) of the second antenna. Introduction of the second filter may generate a boundary condition: a radiator between the first ground point and a second connection point of the second filter is closed at two ends, and both two ends are strong current points. A ¼ wavelength mode of a radiator between the second filter and the first open end may also generate resonance of the radiation band of the second antenna. In this way, the resonance of the radiation band of the second antenna can be supplemented, to improve radiation performance of the second antenna. In addition, the second filter is disposed, so that isolation of the first antenna from the second antenna can be further improved.

With reference to the first aspect, in some optional embodiments, the second filter may be disposed at the first feed point, or may be disposed at a position that is between the first feed point and the first ground point and that is close to the first feed point.

With reference to the first aspect, in some optional embodiments, the first screen frame may be a metal frame. In this case, an appearance of the first screen frame is presented as a metal appearance, and the first metal strip may include the metal frame. Specifically, two slots, that is, a first slot and a second slot, may be disposed on the metal frame, and a metal frame segment between the two slots may be used as the first metal strip. One of the two slots may be disposed at a position close to the first end of the rotating shaft. Herein, "close to" means that a distance between the slot and the rotating shaft is less than a first preset distance (for example, 2 millimeters).

With reference to the first aspect, in some optional embodiments, the first screen frame may include a first frame portion and a second frame portion. The first frame portion is metal (a metal appearance) and the second frame portion is non-metal (a non-metal appearance). One end of the first frame portion is connected to the first end of the rotating shaft and the other end of the first frame portion is connected to the second frame portion and is open. A slot may be disposed at a position that is on the first frame portion and that is close to the first end of the rotating shaft. Herein, the slot may be referred to as a third slot, and the third slot may be the foregoing first slot. Herein, "close to" means that a distance between the slot and the rotating shaft is less than a first preset distance (for example, 2 millimeters). A metal frame segment between the slot and the other end of the first screen frame portion may be used as the first metal strip.

With reference to the first aspect, in some optional embodiments, the first screen frame may be a non-metal frame (for example, a plastic frame or a glass frame). In this case, an appearance of the primary screen frame is presented as non-metal (for example, plastic or glass). The first metal strip may be a metal strip adhered to an inner surface of the non-metal frame, or conductive silver paste may be printed on an inner surface of the non-metal frame.

With reference to the first aspect, in some optional embodiments, the first screen frame may be a metal frame. In this case, an appearance of the first screen frame is presented as a metal appearance, and the second metal strip may include the metal frame. Specifically, a second ground point may be disposed on the metal frame. In addition, a slot may be disposed at a position that is on the metal frame and that is close to the first end of the rotating shaft. Herein, "close to" means that a distance between the slot and the rotating shaft is less than a second preset distance (for example, 2 millimeters). A metal frame segment between the slot and the second ground point may be used as the second metal strip. Herein, the slot may be referred to as a fourth slot.

With reference to the first aspect, in some optional embodiments, the first screen frame may be a non-metal frame (for example, a plastic frame or a glass frame). In this case, an appearance of the first screen frame is presented as a non-metal appearance. The second metal strip may be a metal strip adhered to an inner surface of the non-metal frame, or conductive silver paste may be printed on an inner surface of the non-metal frame.

With reference to the first aspect, in some optional embodiments, a length of the first metal strip may be greater than a length of the second metal strip.

With reference to the first aspect, in some optional embodiments, the second filter may be included in the matching circuit of the first antenna (for example, a diversity antenna). In this case, a second connection point 31-4 of the second filter may coincide with the first feed point 31-1.

With reference to the first aspect, in some optional embodiments, a distance between the first connection point 32-3 of the first filter 32-4 and an open end 32-5 is less than a third preset distance.

With reference to the first aspect, in some optional embodiments, a distance between the connection point 32-3 of the first filter 32-4 and a second ground point 32-1 is less than a fourth preset distance. In this case, the distance between the connection point 32-3 of the first filter 32-4 and the second ground point 32-1 is shorter than a distance between the connection point 32-3 of the first filter 32-4 and an open end 32-5 (or a slot 32-2). In other words, the first filter 32-4 may be disposed at a plurality of positions of the metal strip 13-3. This is not limited in this application.

According to a second aspect, this application provides an electronic device. The electronic device may include a flexible display, a rotating shaft, a frame, and the antenna apparatus according to the first aspect. The flexible display may include a first screen and a second screen, and the first screen and the second screen may be connected by using the rotating shaft. The flexible display can be folded at the rotating shaft, and the flexible display may have a folded state and an open state. The frame may include a first screen frame and a second screen frame. In addition, the electronic device may further include a printed circuit board PCB and a rear cover.

BRIEF DESCRIPTION OF DRAWINGS

To describe the technical solutions in the embodiments of this application more clearly, the following illustrates the accompanying drawings in the embodiments of this application.

DESCRIPTION OF EMBODIMENTS

The following describes the embodiments of the present invention with reference to the accompanying drawings in the embodiments of the present invention.

The technical solutions provided in this application are applicable to an electronic device using one or more of the following communications technologies: a global system for mobile communications (global system for mobile communications, GSM) technology, a code division multiple access (code division multiple access, CDMA) communications technology, a wideband code division multiple access (wideband code division multiple access, WCDMA) communications technology, a general packet radio service (general packet radio service, GPRS), a long term evolution (long term evolution, LTE) communications technology, a Wi-Fi communications technology, a 5G communications technology, an mmWave (mmWave) communications technology, a SUB-6G communications technology, other future communications technologies, and the like. The following embodiments do not highlight a requirement on a communications network, and only describe a working property of an antenna based on a high band or a low band. In this application, the electronic device may be an electronic device such as a mobile phone, a tablet computer, a personal digital assistant (personal digital assistant, PDA), or the like.

Figure 1A:
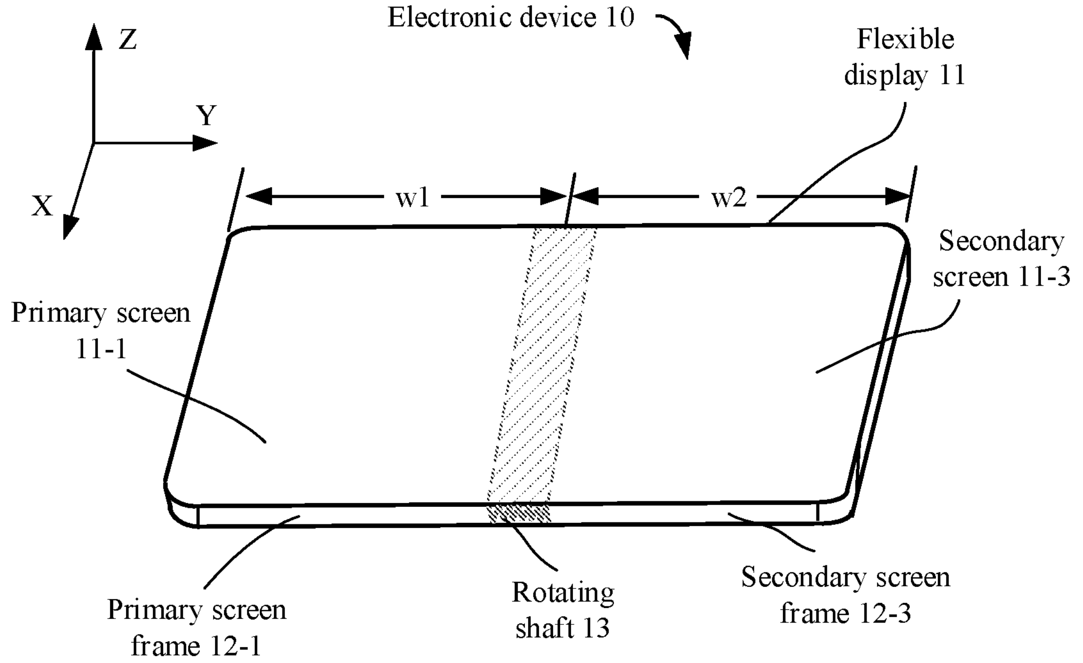
FIG. 1A to FIG. 1C are schematic structural diagrams of an electronic device according to an embodiment of this application.

FIG. 1A shows an example of an electronic device on which an antenna design solution provided in this application is based. As shown in FIG. 1A, the electronic device may include: a flexible display 11, a rotating shaft 13, and a frame. The flexible display 11 may include: a primary screen 11-1 and one or more secondary screens 11-3. To simplify the accompanying drawing, only one secondary screen 11-3 is shown in the accompanying drawing. The primary screen 11-1 and the secondary screen 11-3 are connected by using the rotating shaft 13. A width (w1) of the primary screen 11-1 and a width (w2) of the secondary screen 11-3 may be the same or different. In this application, the primary screen may be referred to as a first screen, and the secondary screen may be referred to as a second screen. The frame of the electronic device may include a primary screen frame 12-1 and a secondary screen frame 12-3. The primary screen frame 12-1 may include three primary screen frame portions. Two primary screen frame portions may be separately close to two ends of the rotating shaft 13, and the remaining primary screen frame portion may be parallel to the rotating shaft 13. Similarly, the secondary screen frame 12-3 may also include three secondary screen frame portions. Two secondary screen frame portions may be separately close to the two ends of the rotating shaft 13, and the remaining secondary screen frame portion may be parallel to the rotating shaft 13. The frame described above may be a metal frame, or may be a non-metal frame (for example, a plastic frame or a glass frame).

Figure 1B:
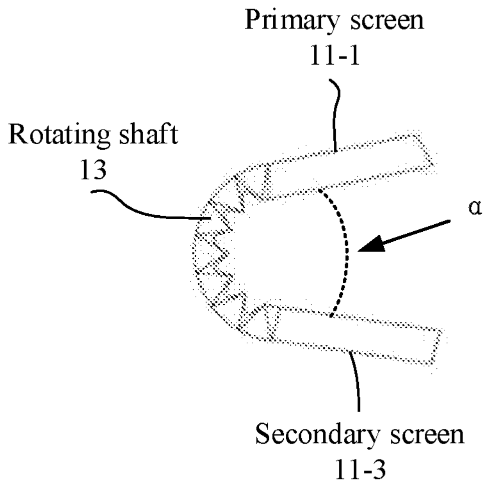

As shown in FIG. 1B, the flexible display 11 can be bent at the rotating shaft 13. Herein, being bent may include that the flexible display 11 is bent outwardly or the flexible display 11 is bent inwardly. Being bent outwardly means that after being bent, the flexible display 11 is presented outside, a rear cover of the electronic device is presented inside, and content displayed on the flexible display 11 is visible to a user. Being bent inwardly means that after being bent, the flexible display 11 is hidden inside, the rear cover of the electronic device is presented outside, and the content displayed on the flexible display 11 is invisible to the user. The flexible display 11 has two states: an open (open) state and a folded (folded) state. The open state may be a state in which an included angle α between the primary screen and the secondary screen exceeds a first angle (for example, 120°). The folded state may be a state in which the included angle α between the primary screen and the secondary screen is less than a second angle (for example, 15°). When the flexible display 11 is in the open state, the electronic device may be shown as an example in FIG. 1A. When the flexible display 11 is in the folded state, the electronic device may be shown as an example in FIG. 1C.

The electronic device may further include a printed circuit board (printed circuit board, PCB) and the rear cover that are not shown.

Figure 1C:
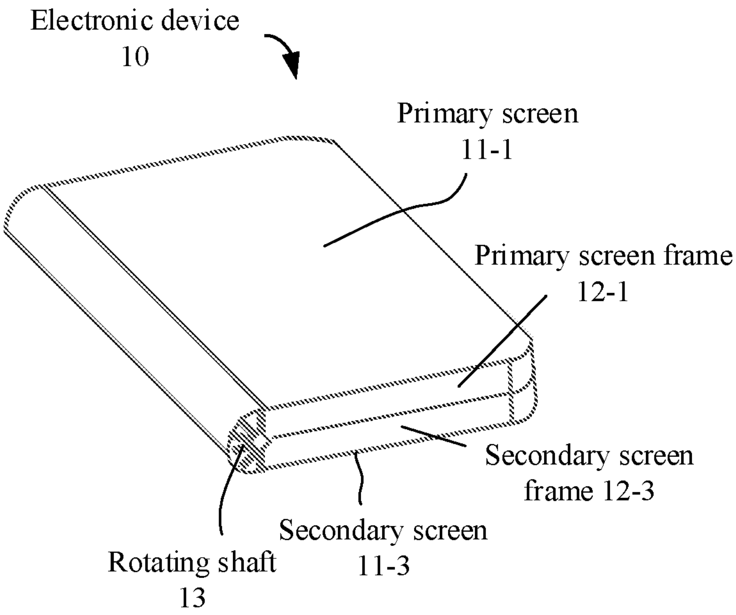

Based on the electronic device shown in FIG. 1A to FIG. 1C, the following describes an antenna design solution provided in this application.

A main design idea of this application may include: A first metal strip is disposed on the primary screen frame 12-1 close to one end of the rotating shaft 13, and a second metal strip is disposed on the secondary screen frame 12-3 close to the same end of the rotating shaft 13. The first metal strip may be implemented as a plurality of antennas, that is, a first antenna (for example, a diversity antenna) and a second antenna (for example, a GPS antenna) described below, through dual-feed design. When the flexible display 11 is in the folded state, the first metal strip may be coupled to the second metal strip to generate radiation. In this case, the second metal strip may be used as a parasitic antenna of the first metal strip. In this way, the second metal strip disposed on the secondary screen frame 12-3 can be effectively used, to improve radiation efficiency of the first metal strip disposed on the primary screen frame 12-1, optimize antenna performance of the first metal strip when the flexible display 11 is in the folded state, and reduce a difference between the antenna performance in the folded state of the flexible display 11 and antenna performance in the open state of the flexible display 11.

First, antenna design solutions provided in this application are summarized with reference to FIG. 2A to FIG. 2D.

Figure 2A:
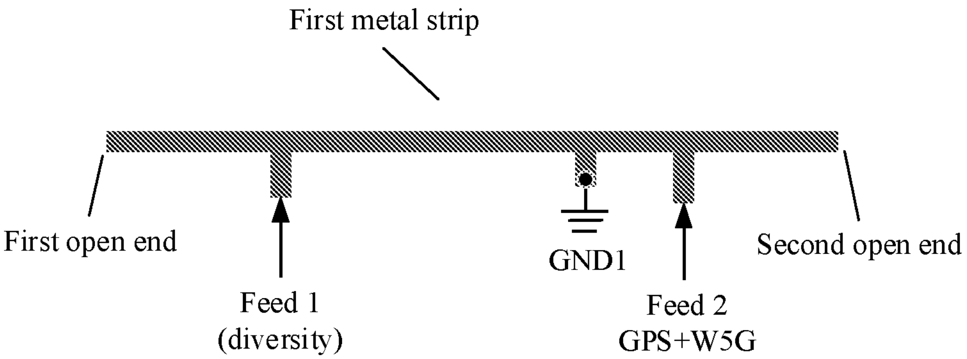
FIG. 2A to FIG. 2D are schematic diagrams of several antenna apparatuses according to this application.

FIG. 2A shows, in a simplified manner, a plurality of antennas implemented by the first metal strip through dual-feed design. As shown in FIG. 2A, two ends of the first metal strip may be open and include a first open end and a second open end. The second open end is closer to the rotating shaft 13 than the first open end. The first metal strip may have two feed points: a feed 1 and a feed 2. The feed 1 may be referred to as a first feed point, and the feed 2 may be referred to as a second feed point. The first feed point may be a feed point of a diversity antenna, and is connected to a matching circuit of the diversity antenna. The second feed point may be a feed point of a GPS antenna, and is connected to a matching circuit of the GPS antenna. A ground point (GND1) may be disposed between the two feed points. The ground point is grounded to isolate the diversity antenna from the GPS antenna. The ground point (GND1) may be referred to as a first ground point.

The matching circuit of the diversity antenna may include a capacitor connected in parallel and a capacitor connected in series, to switch between bands. A low-frequency (for example, 690 MHz to 960 MHz) signal of the diversity antenna may be generated by a left-hand mode, and an intermediate-frequency or a high-frequency (for example, 17000 MHz to 2700 MHz) signal may be generated by a ¼ wavelength mode of a radiator from the first feed point (the feed 1) to the first open end. In addition, an adjustable device in the matching circuit adjusts a resonance frequency. A ¾ wavelength mode of a radiator from the first ground point (GND1) to the first open end may also generate a signal near 2.7 GHz, so that LTE B7 resonance in a carrier aggregation (carrier aggregation, CA) state may be supplemented. An LTE B7 band ranges from 2500 MHz to 2570 MHz for an uplink and from 2620 MHz to 2690 MHz for a downlink.

A signal of a radiation band (a GPS band near 1575 MHz) of the GPS antenna may be generated by a ¼ wavelength mode of a radiator from the second feed point (the feed 2) to the second open end. In addition, a $3^{rd}$-order frequency of the GPS band is a 5 GHz band. Therefore, the radiator from the second feed point (the feed 2) to the second open end may radiate both a signal of the GPS band and a signal of the 5 GHz band.

It may be understood that, when the flexible display 11 is in the folded state, because of blocking by the secondary screen 11-3, antenna performance of the first metal strip disposed on the primary screen frame deteriorates, and is definitely worse than antenna performance of the first metal strip when the flexible display 11 is in the open state.

Figure 2B:
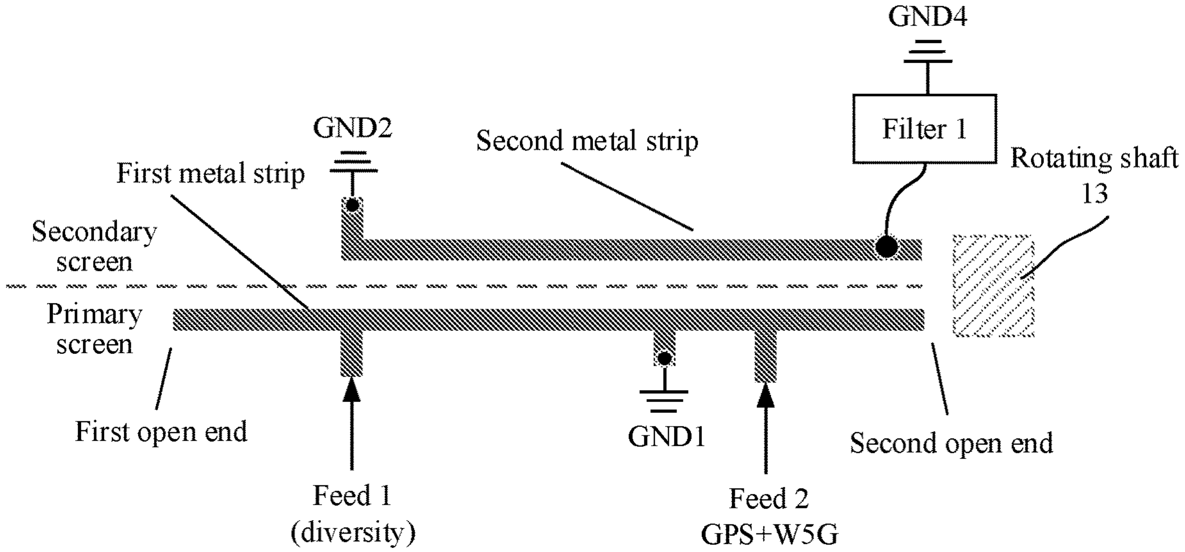

To improve antenna performance of the first metal strip disposed on the primary screen frame, the antenna design solution provided in this application fully utilizes the second metal strip disposed on the secondary screen frame. FIG. 2B shows, in a simplified manner, an antenna structure including the first metal strip and the second metal strip. For descriptions of the first metal strip, refer to related descriptions in FIG. 2A. As shown in FIG. 2B, one end of the second metal strip is closed (grounded GND2), and one end that is of the second metal strip and that is close to the rotating shaft 13 is open. A filter 1 may be disposed at a position that is on the second metal strip and that is close to the open end. An operating band of the filter 1 may include: a radiation band of the diversity antenna and a radiation band of the GPS antenna, that is, the filter 1 may be a dual-band filter that can work in both a low band and a GPS band. In a specific implementation, the filter 1 may be a high-order filter, for example, a third-order filter. When the flexible display 11 is in the folded state, the first metal strip may be coupled to the second metal strip to generate radiation in a low band and a GPS band, so that antenna performance of the first metal strip in the low band and the GPS band can be improved. In this case, the second metal strip may be used as a parasitic structure of the first metal strip.

Figure 2C:
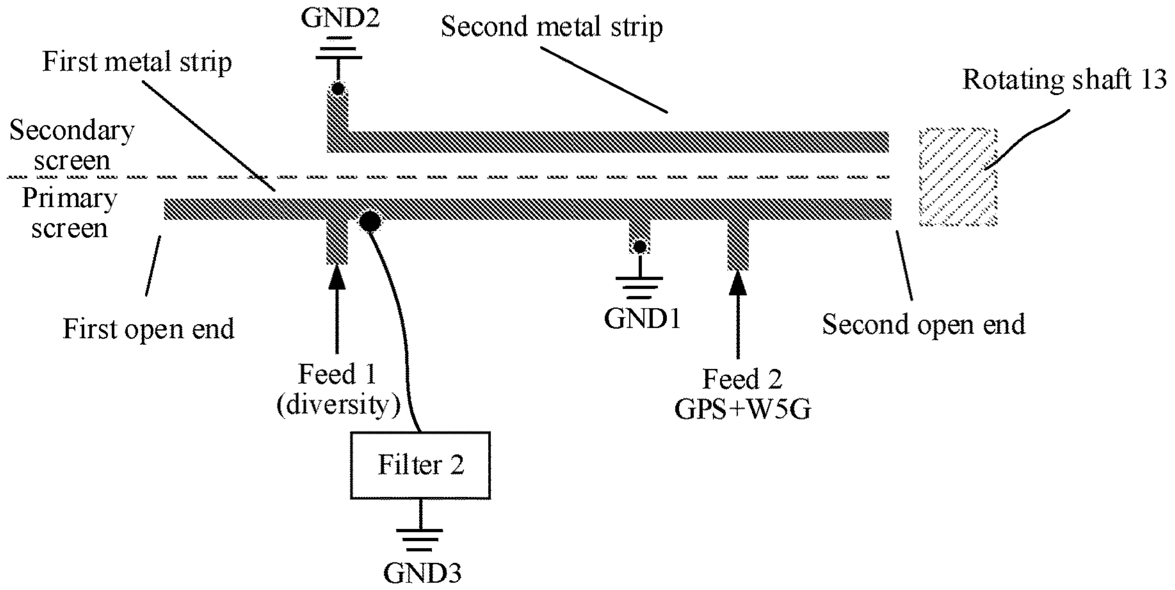

As can be understood, because of existence of the rotating shaft 13, a side that is of the first metal strip and that is close to the rotating shaft is more closed than the other side. To improve antenna performance on the side that is of the first metal strip and that is close to the rotating shaft, for example, improve antenna performance of an antenna on this side in a GPS band, as shown in FIG. 2C, a filter 2 may be further disposed on a side that is of the first metal strip and that is close to the first open end. The filter 2 may be presented as a grounded bandpass in the GPS band. Introduction of the filter 2 may generate a boundary condition: two ends of a radiator between the first ground point (GND1) and the filter 2 are closed, and both ends are strong current points. A ¼ wavelength mode of a radiator between the filter 2 and the first open end may also generate resonance of the GPS band. In this way, resonance of the GPS band can be supplemented, to improve radiation performance of the GPS antenna. In addition, the filter 2 is disposed, so that isolation of the diversity antenna from the GPS antenna can be further improved, and resonance of the GPS antenna is not affected when a diversity state of the diversity antenna changes.

Figure 2D:
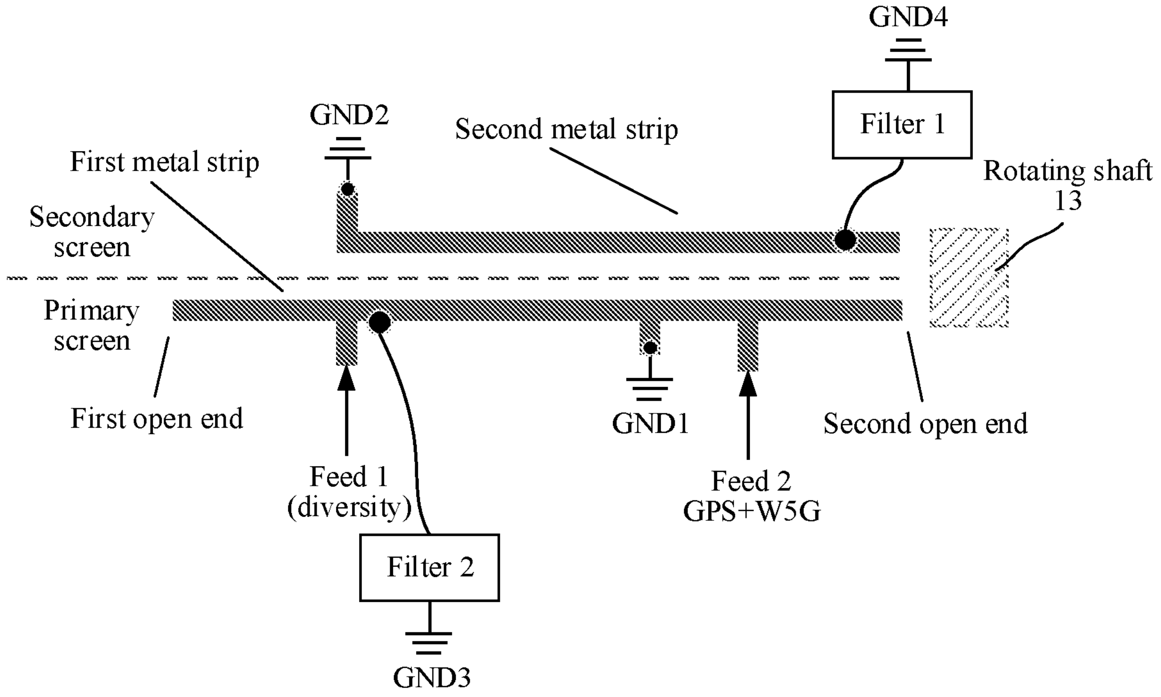

As shown in FIG. 2D, the filter 1 may be disposed at a position that is on the second metal strip and that is close to an open end, and the filter 2 may be disposed on a side that is of the first metal strip and that is close to the first open end. In this way, antenna performance of the first metal strip on the primary screen frame 12-1 can be more significantly improved, blocking by the secondary screen 11-3 and blocking by the rotating shaft 13 can be avoided, isolation of the diversity antenna from the GPS antenna on the first metal strip can be further improved, and impact of a change of a diversity state on GPS resonance can be avoided.

In this application, an antenna fed by the first feed point (the feed 1) may be referred to as the first antenna. The first antenna is not limited to a diversity antenna, and may further include another antenna, for example, a 2.4 GHz Wi-Fi antenna. In this application, an antenna fed by the second feed point (the feed 2) may be referred to as the second antenna. The second feed point (the feed 2) may also be connected to a matching circuit of another antenna, for example, an LTE B3 antenna or an LTE B5 antenna, that is not limited to a GPS antenna.

Figure 3A:
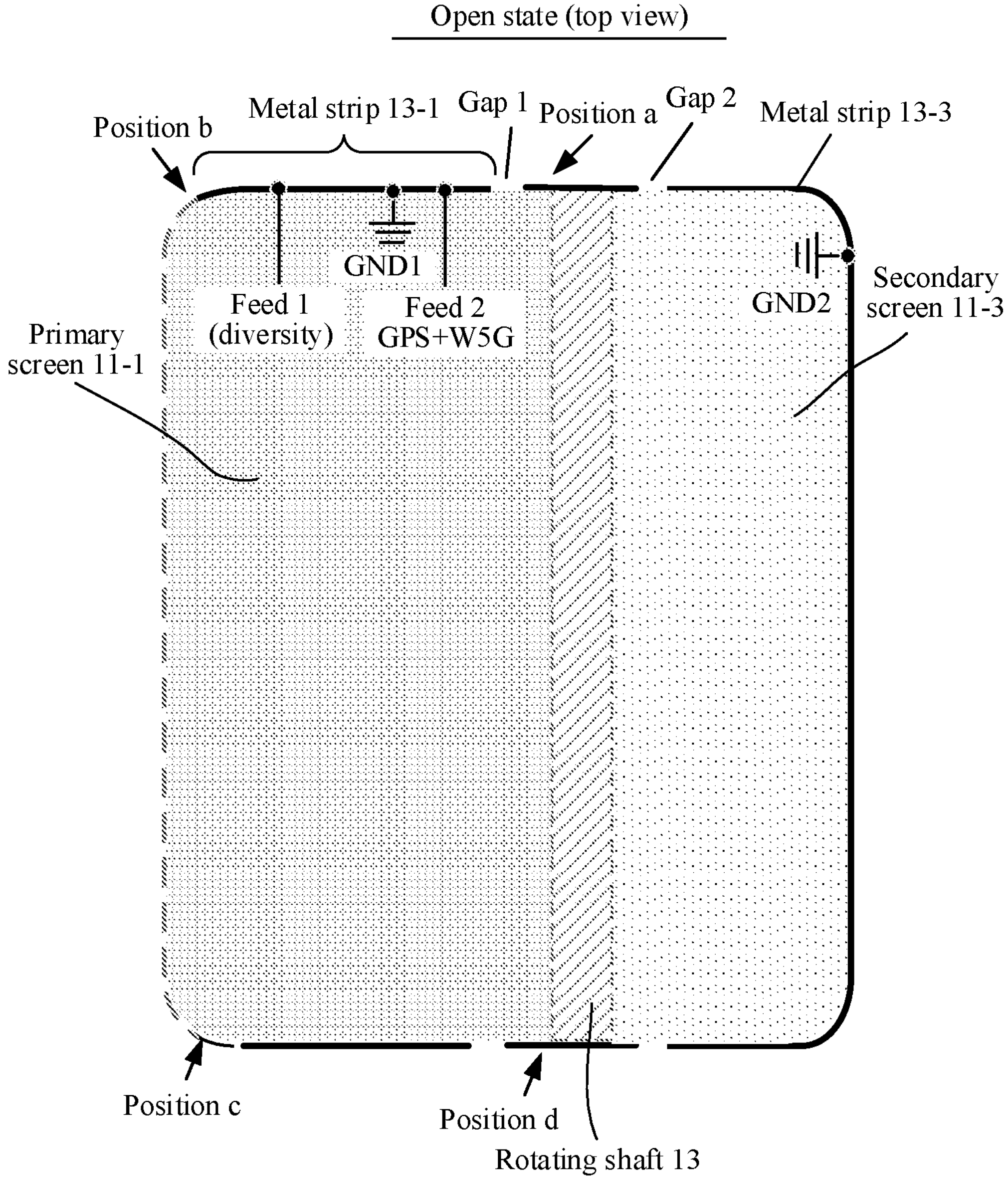
FIG. 3A to FIG. 3C are schematic architectural diagrams of an antenna structure in an electronic device according to this application.
Figure 3B:
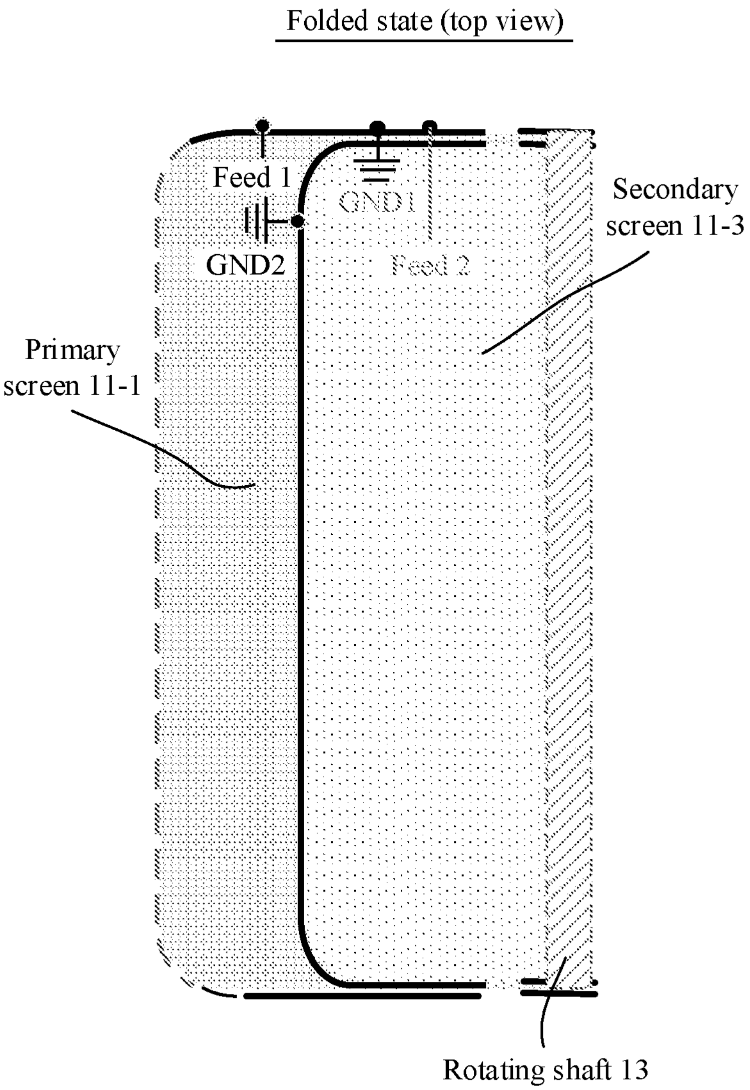
Figure 3C:
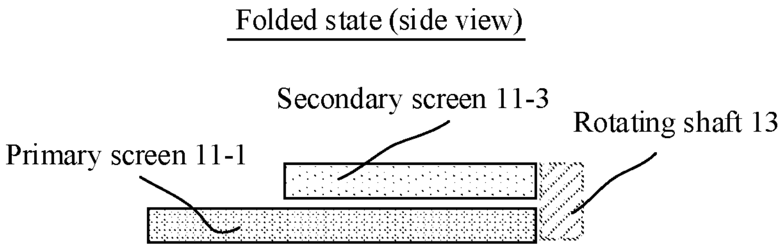

Second, an architecture of an antenna structure of this application in an electronic device is summarized with reference to FIG. 3A to FIG. 3C.

As shown in FIG. 3A to FIG. 3C, the first metal strip may be a metal strip 13-1, and the second metal strip may be a metal strip 13-3. FIG. 3A shows an antenna structure including the metal strip 13-1 and the metal strip 13-3 when the flexible display 11 is in the open state, and FIG. 3B and FIG. 3C show antenna structures including the metal strip 13-1 and the metal strip 13-3 when the flexible display 11 is in the folded state.

The metal strip 13-1 may be disposed on the primary screen frame 12-1 close to one end of the rotating shaft 13. For ease of subsequent reference, one end of the rotating shaft 13 may be referred to as a first end of the rotating shaft 13. The metal strip 13-1 may be specifically implemented in the following manners:

Manner 1: The primary screen frame 12-1 may be a metal frame. In this case, an appearance of the primary screen frame 12-1 is presented as a metal appearance, and the metal strip 13-1 may include the metal frame. Specifically, two slots may be disposed on the metal frame, for example, a first slot is disposed near a position a and a second slot is disposed near a position b. A metal frame segment between the two slots may be used as the metal strip 13-1. One (for example, the slot 1 in FIG. 3A) of the slots slot may be disposed at a position close to the first end of the rotating shaft 13. Herein, "close to" means that a distance between the slot (for example, the slot 1) and the rotating shaft 13 is less than a first preset distance (for example, 2 millimeters).

Manner 2: The primary screen frame 12-1 may include a first frame portion (for example, a primary screen frame portion between a position a and a position b) and a second frame portion (for example, a primary screen frame portion between the position b and a position c or a primary screen frame portion between the position b and a position d). The first frame portion is metal (a metal appearance) and the second frame portion is non-metal (a non-metal appearance). One end of the first frame portion is connected to the first end of the rotating shaft 13, and the other end of the first frame portion is connected to the second frame portion and is open. A slot may be disposed at a position that is on the first frame portion and that is close to the first end of the rotating shaft 13. Herein, the slot may be referred to as a third slot, and the third slot may be the foregoing first slot. Herein, "close to" means that a distance between the slot (for example, the slot 1) and the rotating shaft 13 is less than a first preset distance (for example, 2 millimeters). A metal frame segment between the slot and the other end of the first frame portion may be used as the metal strip 13-1.

Manner 3: The primary screen frame 12-1 may be a non-metal frame (for example, a plastic frame or a glass frame). In this case, an appearance of the primary screen frame is presented as non-metal (for example, plastic or glass). The metal strip 13-1 may be a metal strip adhered to an inner surface of the non-metal frame, or conductive silver paste may be printed on an inner surface of the non-metal frame.

The metal strip 13-3 may be disposed on the secondary screen frame 12-3 close to the first end of the rotating shaft 13. The metal strip 13-3 may be specifically implemented in the following several manners:

Manner 1: The secondary screen frame 12-3 may be a metal frame. In this case, an appearance of the secondary screen frame 12-3 is presented as a metal appearance, and the metal strip 13-3 may include the metal frame. Specifically, a second ground point (GND2) may be disposed on the metal frame. In addition, a slot (a slot 2) may be disposed at a position that is on the metal frame and that is close to the first end of the rotating shaft 13. Herein, "close to" means that a distance between the slot (for example, the slot 2) and the rotating shaft 13 is less than a second preset distance (for example, 2 millimeters). A metal frame segment between the slot (the slot 2) and the second ground point (GND2) may be used as the metal strip 13-3. Herein, the slot may be referred to as a fourth slot.

Manner 2: The secondary screen frame 12-3 may be a non-metal frame (for example, a plastic frame or a glass frame). In this case, an appearance of the secondary screen frame 12-3 is presented as non-metal appearance. The metal strip 13-3 may be a metal strip adhered to an inner surface of the non-metal frame, or conductive silver paste may be printed on an inner surface of the non-metal frame.

As shown in FIG. 3A to FIG. 3C, the metal strip 13-1 may have two feed points: a feed 1 and a feed 2. The feed 1 may be a feed point of a diversity antenna, and the feed 2 may be a feed point of a GPS antenna. A ground point (GND1) may be disposed between the two feed points. The filter 1 (not shown in FIG. 3A and FIG. 3B) may be disposed near a position that is on the metal strip 13-3 and that is close to the open end (the slot 2), to improve antenna performance of the metal strip 13-1 and resolve a problem of blocking by the secondary screen 11-3. The filter 2 (not shown in FIG. 3A and FIG. 3B) may be disposed on a side that is of the metal strip 13-1 and that is away from the rotating shaft 13, to further improve antenna performance on a side that is of the metal strip 13-1 and that is close to the rotating shaft 13 and resolve a problem of blocking by the rotating shaft 13. For details, refer to related content in FIG. 2A to FIG. 2D. Details are not described herein again.

A length of the metal strip 13-1 may be greater than, equal to, or less than a length of the metal strip 13-3. When the length of the metal strip 13-1 is greater than the length of the metal strip 13-3, antenna performance on the side that is of the metal strip 13-1 and that is away from the rotating shaft 13 is relatively desirable. This is because when the flexible display is in the folded state, an open condition on the side that is of the metal strip 13-1 and that is away from the rotating shaft 13 is desirable.

The following describes in detail antenna structures provided in several embodiments of this application.

Embodiment 1

Figure 4A:
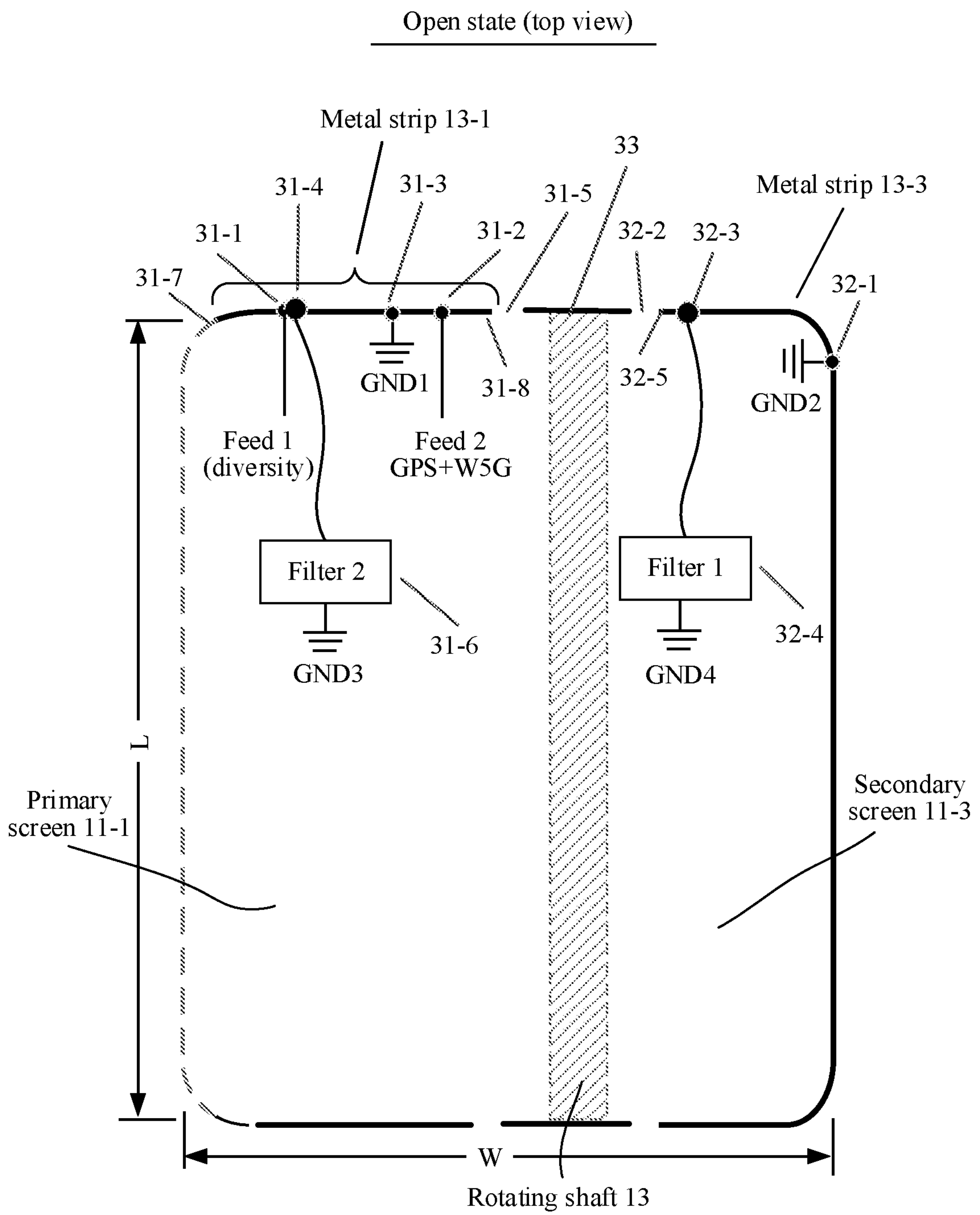
FIG. 4A to FIG. 4C are schematic diagrams of antenna design solutions according to an embodiment of this application.
Figure 4B:
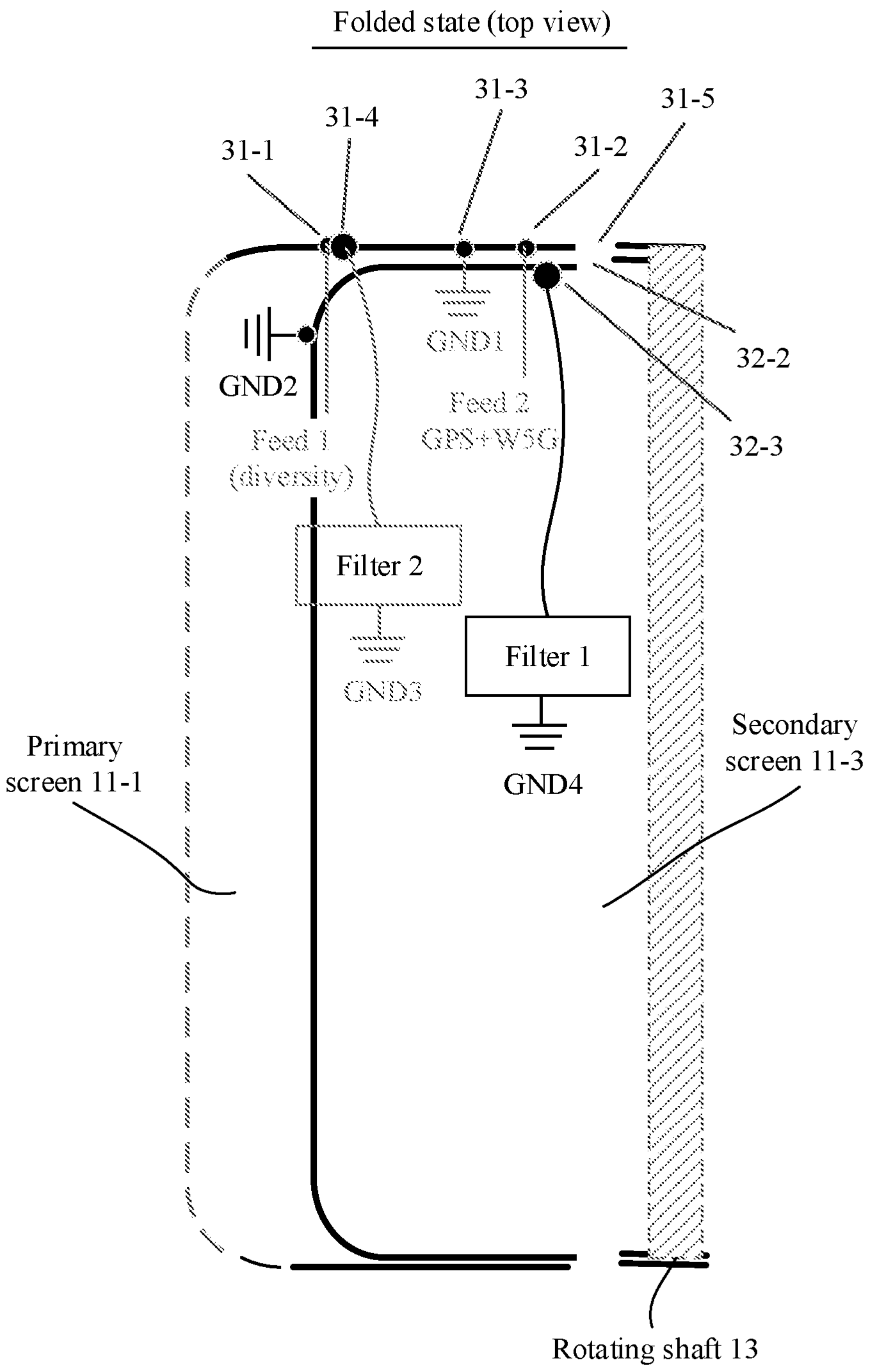
Figure 4C:
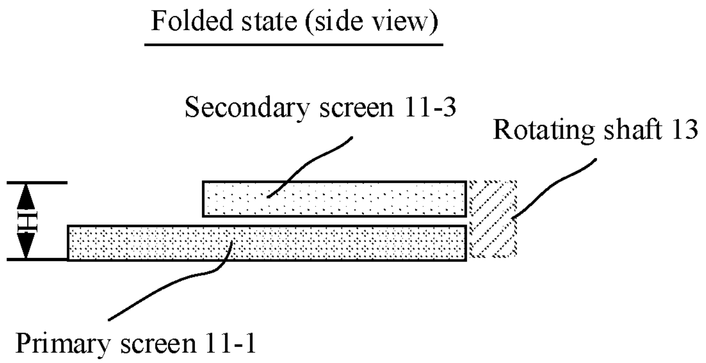

FIG. 4A to FIG. 4C show examples of antenna structures according to Embodiment 1. FIG. 4A shows an antenna structure formed when the flexible display 11 is in the open state, and FIG. 4B and FIG. 4C show antenna structures formed when the flexible display 11 is in the folded state. As shown in FIG. 4A to FIG. 4C, the antenna structure may include: the metal strip 13-1 disposed on the primary screen frame 12-1 and the metal strip 13-3 disposed on the secondary screen frame 12-3. A size of an electronic device on which the antenna structure according to this embodiment is based may be 160 (mm)×75 (mm)×10.5 (mm). Herein, 160 (mm) is a width of the flexible display 11 in the open state, that is, Win FIG. 4A, 75 (mm) is a length of the flexible display 11, that is, L in FIG. 4A, and 10.5 (mm) is a thickness of the flexible display 11 in the folded state, that is, H in FIG. 4C. A length of the metal strip 13-1 on the primary screen frame 12-1 may be about 58.5 mm, and a length of the metal strip 13-3 on the secondary screen frame 12-3 may be about 43 mm. A non-overlapped width of the primary screen 11-1 and the secondary screen 11-3 may be 15 mm when the flexible display 11 is in the open state.

Two ends of the metal strip 13-1 may be open and include a first open end 31-7 and a second open end 31-8. The second open end 31-8 is closer to the first end 33 of the rotating shaft 13 than the first open end 31-7. When the primary screen frame 12-1 is a metal frame, the second open end 31-8 of the metal strip 13-1 may be implemented by disposing a slot 31-5 at a position close to the first end 33 of the rotating shaft 13.

The metal strip 13-1 may have two feed points: a first feed point 31-1 and a second feed point 31-2. The first feed point 31-1 may be connected to a matching circuit of a diversity antenna. The second feed point 31-2 may be connected to a matching circuit of a GPS antenna. A first ground point 31-3 (GND1) may be disposed between the two feed points to isolate the diversity antenna from the GPS antenna.

One end 32-3 that is of the metal strip 13-3 and that is close to the rotating shaft 13 is open, and the other end 32-1 of the metal strip 13-3 is grounded (GND2). When the secondary screen frame 12-3 is a metal frame, an open end 32-5 of the metal strip 13-3 may be implemented by disposing a slot 32-2 at a position close to the first end 33 of the rotating shaft 13.

A first filter 32-4 may be disposed at a position that is on the metal strip 13-3 and that is close to the open end 32-5. Herein, "close to" means that a distance between a first connection point 32-3 of the first filter 32-4 and the open end 32-5 is less than a third preset distance. An operating band of the first filter 32-4 may include a radiation band of the diversity antenna and a radiation band of the GPS antenna, for example, a low band and a GPS band. The first filter 32-4 may be a dual-band filter that can operate in the low band and the GPS band. When the flexible display 11 is in the folded state (as shown in FIG. 4B), the metal strip 13-1 may be coupled to the metal strip 13-3 to generate radiation in the radiation band of the diversity antenna and the radiation band of the GPS antenna (that is, the low band and the GPS band), so that a problem of blocking by the secondary screen 11-3 can be resolved and antenna performance of the metal strip 13-1 can be improved. In this case, the metal strip 13-3 may be used as a parasitic structure of the metal strip 13-1.

Figure 5A:
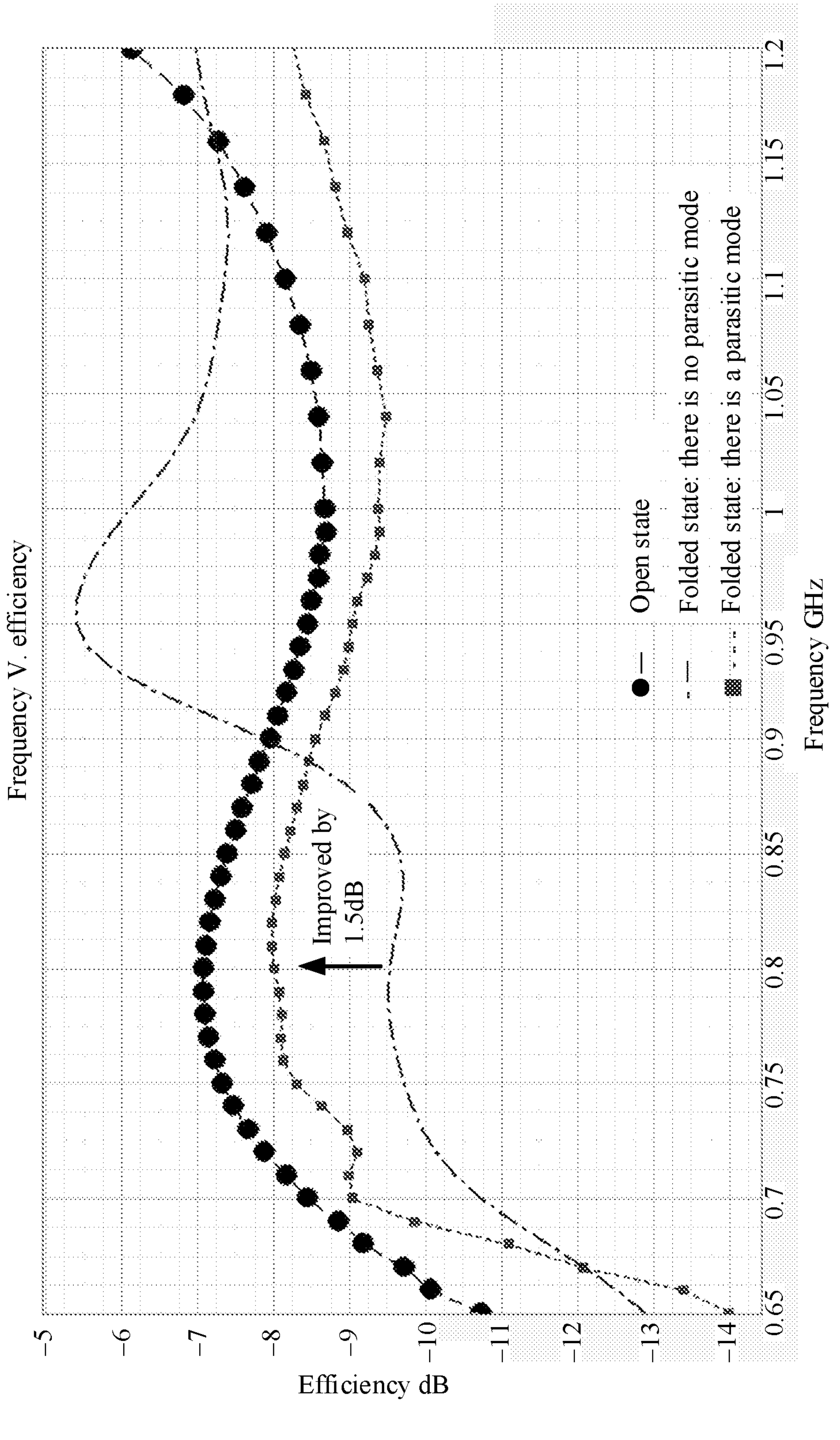
FIG. 5A and FIG. 5B are some schematic simulation diagrams of the antenna design solutions shown in FIG. 4A and FIG. 4B.
Figure 5B:
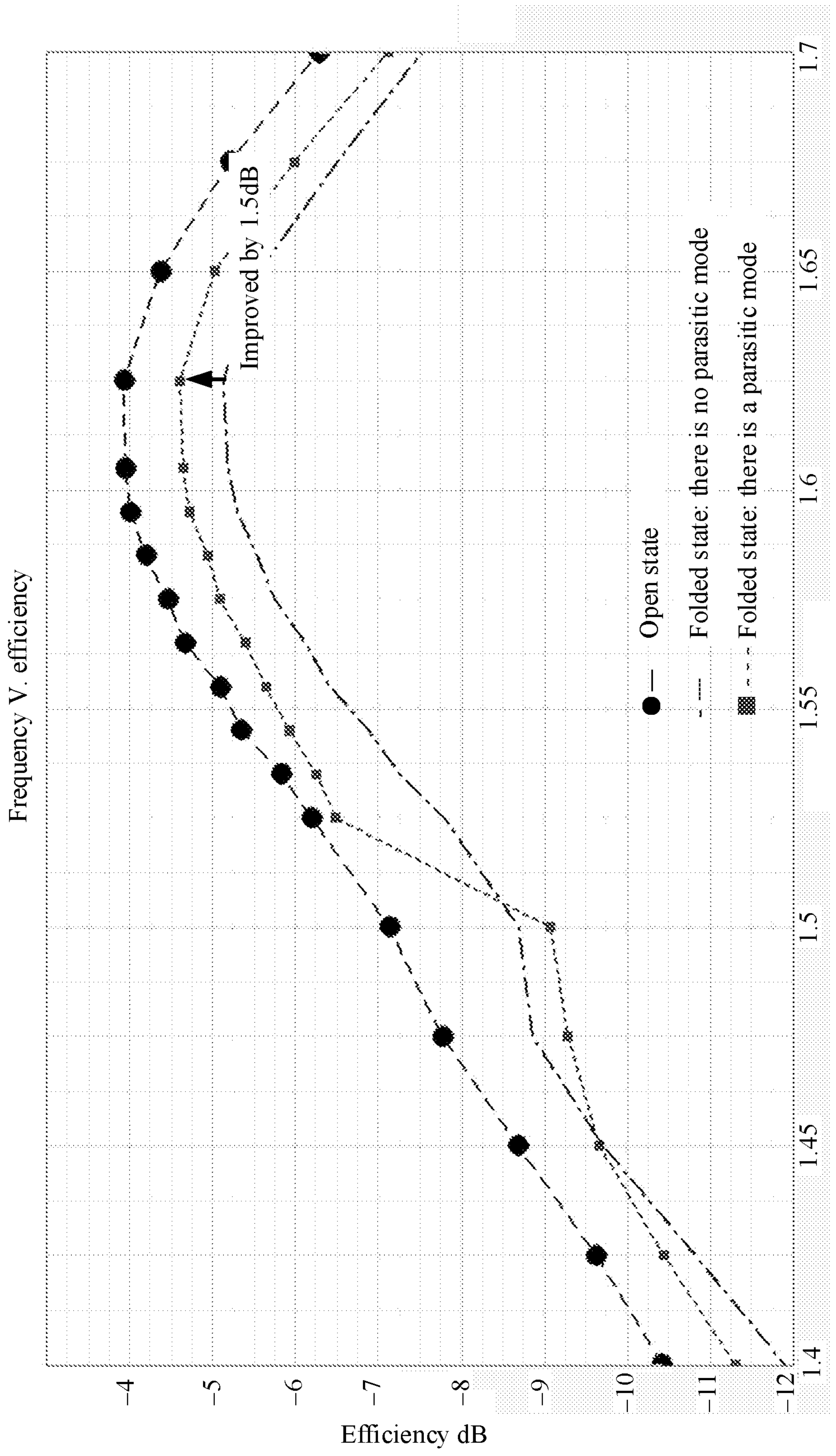

FIG. 5A and FIG. 5B show efficiency simulation curves of antenna structures (the first filter 32-4 is separately added) when the flexible display is in the folded state according to this embodiment. FIG. 5A compares radiation efficiency of an antenna structure with the first filter 32-4 with radiation efficiency of an antenna structure without the first filter 32-4 in a low band (0.7 GHz to 0.96 GHz) when the flexible display is in the folded state. As can be seen, when the flexible display is in the folded state, because the first filter 32-4 is disposed on the metal strip 13-3 on the secondary screen 11-3, antenna radiation efficiency in the low band is improved by about 1.5 dB. FIG. 5B compares radiation efficiency of an antenna structure with the first filter 32-4 with radiation efficiency of an antenna structure without the first filter 32-4 in a GPS band (1.55 GHz to 1.65 GHz) when the flexible display is in the folded state. As can be seen, when the flexible display is in the folded state, because the first filter 32-4 is disposed on the metal strip 13-3 on the secondary screen 11-3, antenna radiation efficiency in the GPS band is improved by about 0.5 dB.

Figure 6:
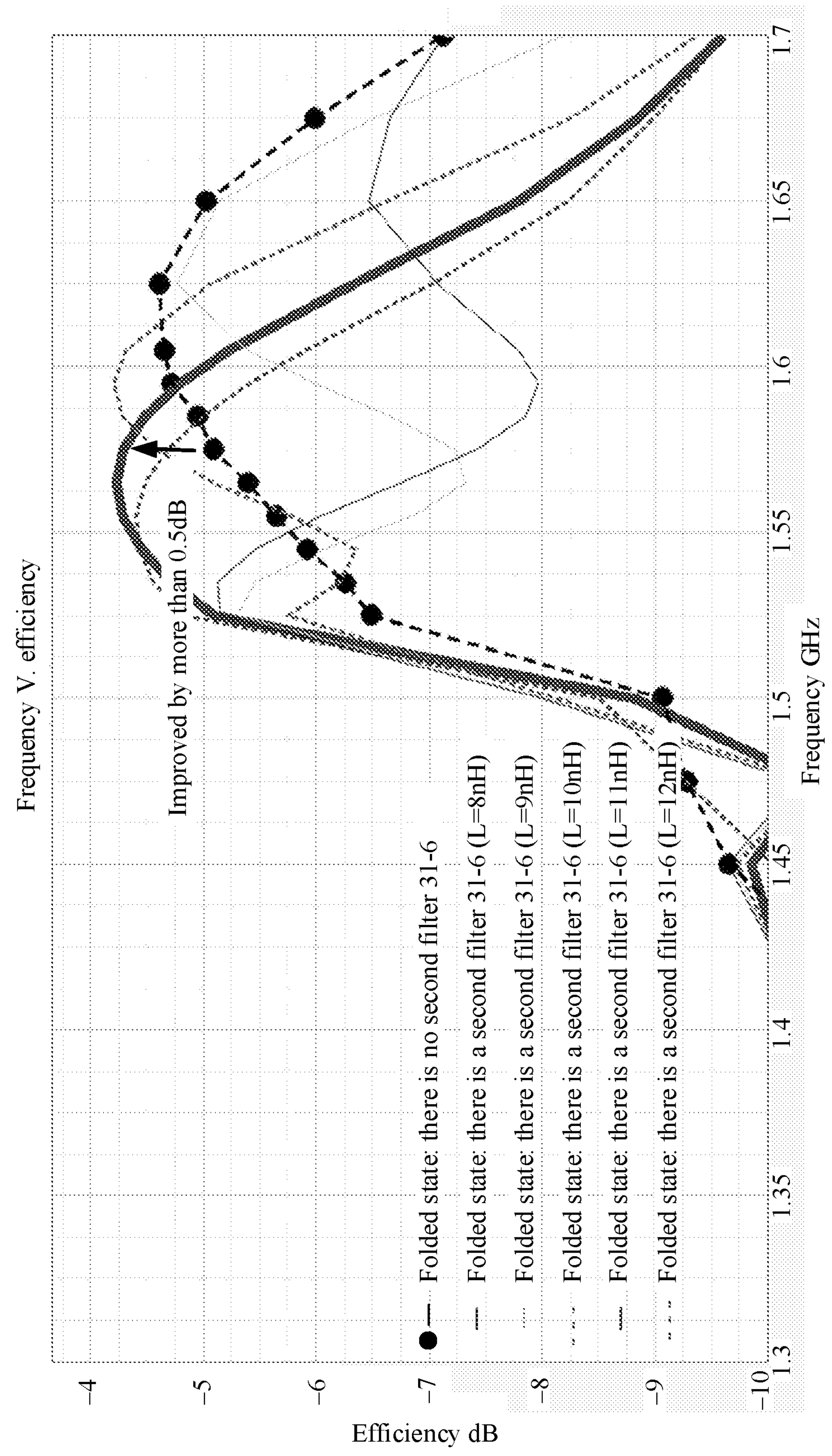
FIG. 6 is another schematic simulation diagram of the antenna design solutions shown in FIG. 4A and FIG. 4B.

In addition, a second filter 31-6 may be further disposed on a side that is of the metal strip 13-1 and that is close to the first open end 31-7. Specifically, the second filter 31-6 may be disposed at the first feed point 31-1 (the feed 1). That is, a second connection point 31-4 of the second filter 31-6 coincides with the first feed point 31-1. The second filter 31-6 may be presented as a grounded bandpass in a radiation band of a GPS antenna. A ¼ wavelength mode of a radiator between the position 31-4 and the first open end 31-7 may also generate resonance in a GPS band. In this way, resonance of a radiation band of a GPS antenna can be supplemented, to improve radiation performance of the GPS antenna. FIG. 6 shows an efficiency simulation curve of an antenna structure (the second filter 31-6 is further added) when the flexible display is in the folded state according to this embodiment. As can be seen, when the flexible display is in the folded state, because the second filter 31-6 is disposed on the metal strip 13-1 on the primary screen 11-1, antenna radiation efficiency in the GPS band is improved by more than 0.5 dB. The second filter 31-6 is introduced, so that isolation of the diversity antenna from the GPS antenna can be further improved, and resonance of the GPS antenna may not be affected when a diversity state of the diversity antenna changes.

In Embodiment 1, the second filter 31-6 may be included in a matching circuit of a diversity antenna. In this case, the second connection point 31-4 of the second filter 31-6 may coincide with the first feed point 31-1. The matching circuit and a feeding source may be placed on a PCB. The metal strip 13-1 may be connected to the matching circuit and the feeding source on the PCB through structural design (for example, a metal spring). In addition to the second filter 31-6, the matching circuit of the diversity antenna may further include a variable capacitor connected in parallel and a variable capacitor connected in series to perform frequency tuning.

Embodiment 2

Figure 7A:
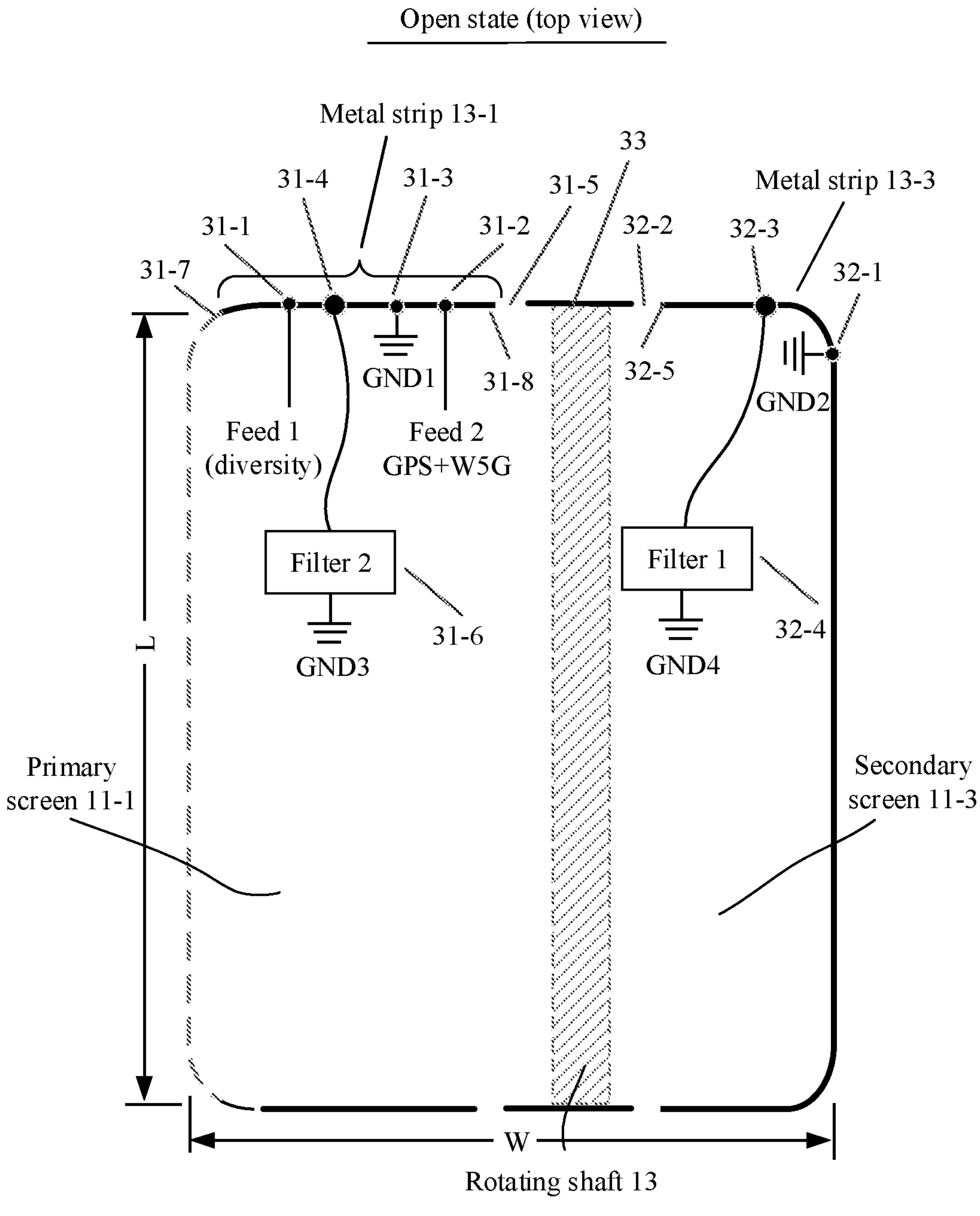
FIG. 7A and FIG. 7B are schematic diagrams of antenna design solutions according to another embodiment of this application.
Figure 7B:
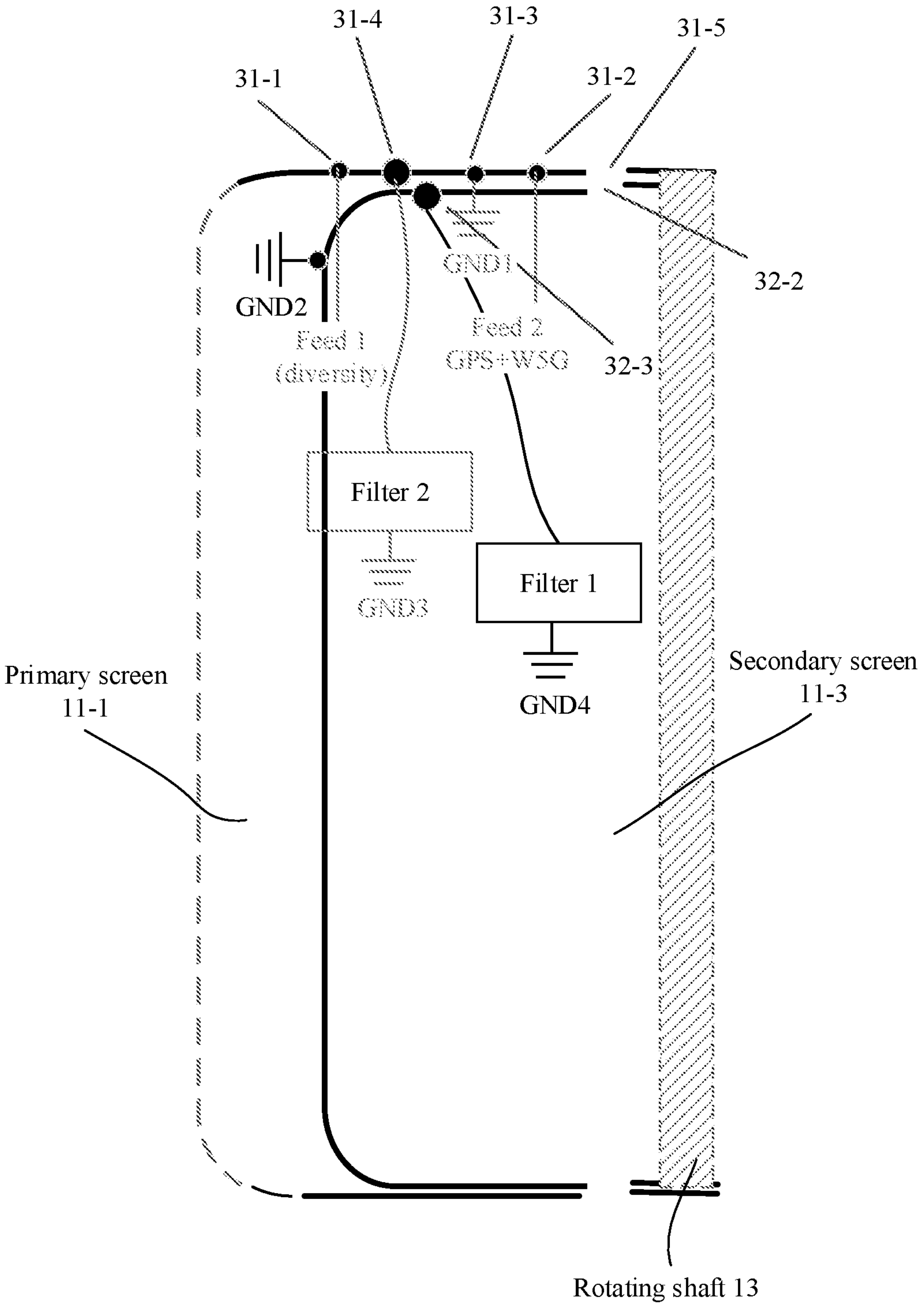

FIG. 7A and FIG. 7B show examples of an antenna structure according to Embodiment 2. Different from the antenna structure according to Embodiment 1, the first filter 32-4 may be disposed on a side that is of the metal strip 13-3 and that is close to the ground, that is, a distance between the connection point 32-3 of the first filter 32-4 and the second ground point 32-1 is less than a fourth preset distance. In this case, a distance between the connection point 32-3 of the first filter 32-4 and the second ground point 32-1 is shorter than a distance between the connection point 32-3 of the first filter 32-4 and the open end 32-5 (or the slot 32-2). In other words, a plurality of positions of the first filter 32-4 on the metal strip 13-3 may be selected. This is not limited in this application.

Embodiment 3

Figure 8A:
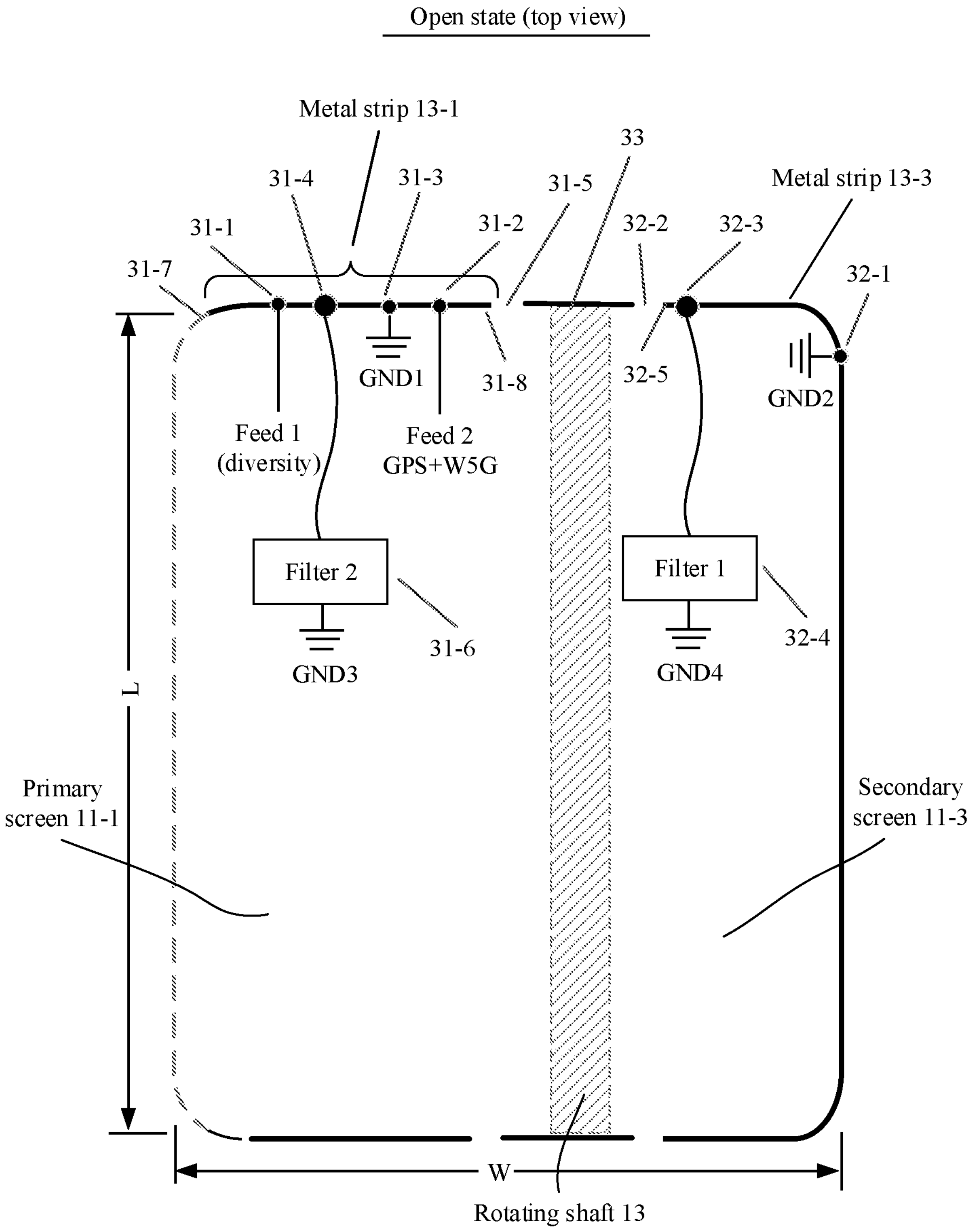
FIG. 8A and FIG. 8B are schematic diagrams of antenna design solutions according to still another embodiment of this application.
Figure 8B:
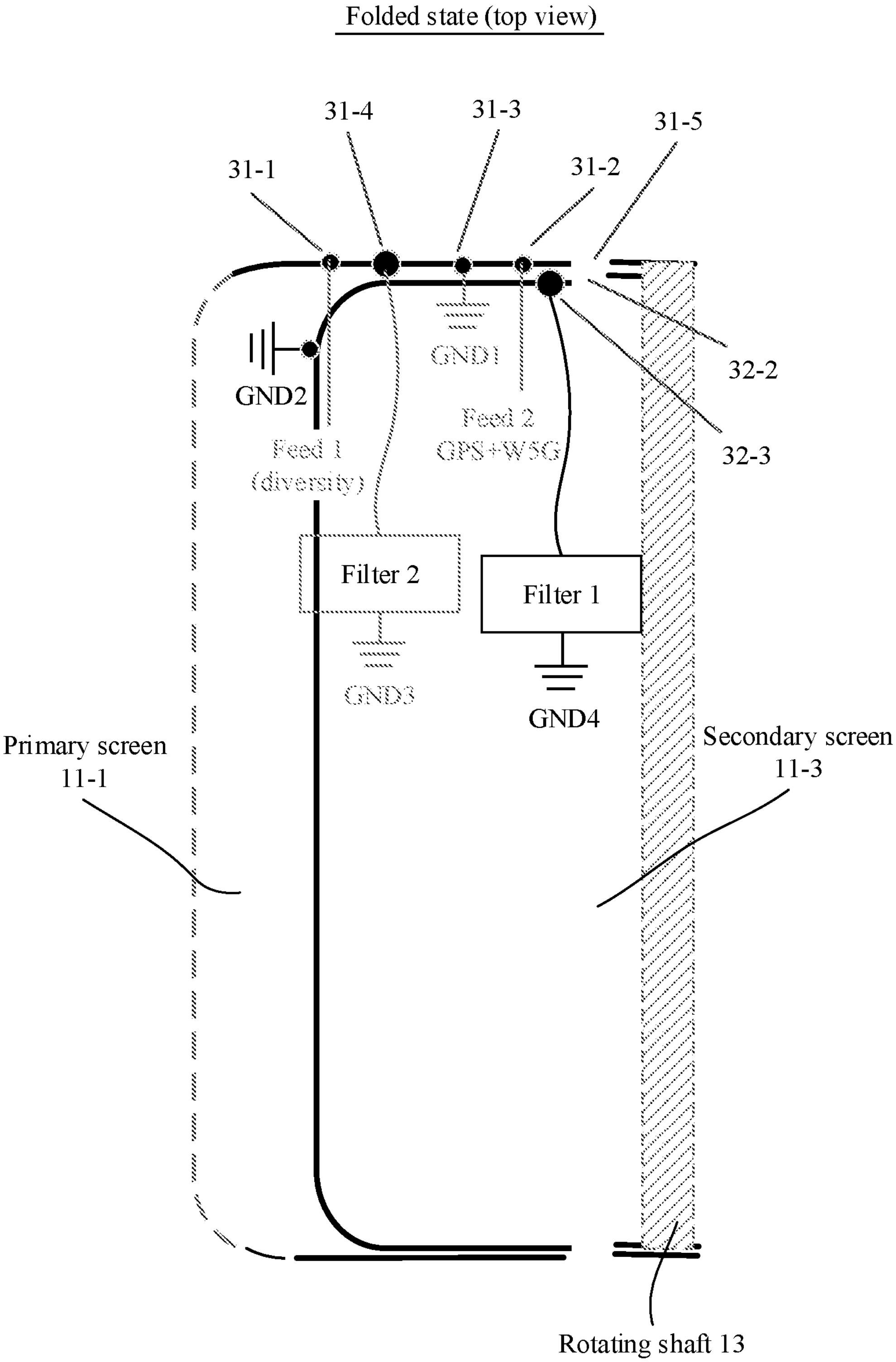

FIG. 8A and FIG. 8B show examples of an antenna structure according to Embodiment 3. Different from the antenna structure according to Embodiment 1, the second filter 31-6 may be disposed at another position that is not limited to the first feed point 31-1 (the feed 1) and that is between the first feed point 31-1 (the feed 1) and the first ground point 31-3.

In Embodiment 1 to Embodiment 3, the first antenna (for example, a diversity antenna) may include the first feed point 31-1 (the feed 1), a matching circuit connected to the first feed point 31-1 (the feed 1), and the following radiators: a radiator from the first ground point 31-3 to the first open end 31-7 and a radiator from the first feed point 31-1 (the feed 1) to the first open end 31-7. A ¼ wavelength mode of the radiator from the first ground point 31-3 to the first open end 31-7 may generate low-frequency resonance, a ¼ wavelength mode of the radiator from the first feed point 31-1 (the feed 1) to the first open end 31-7 may generate intermediate-frequency resonance and high-frequency resonance, and a ¾ wavelength mode of the radiator from the first ground point 31-3 to the first open end 31-7 may further generate resonance near 2.7 GHz, to supplement LTE B7 resonance in a CA state.

In Embodiment 1 to Embodiment 3, the second antenna (for example, a GPS antenna) may include the second feed point 31-2 (the feed 2), a matching circuit connected to the second feed point 31-2 (the feed 2), and the following radiators: a radiator from the first ground point 31-3 to the second open end 31-8 and a radiator from the second filter 31-4 (the filter 2) to the second open end 31-8. A ¼ wavelength mode of the radiator from the first ground point 31-3 to the second open end 31-8 may generate resonance in a GPS band, a ¾ wavelength mode of the radiator from the first ground point 31-3 to the second open end 31-8 may generate resonance in a 5 GHz band, and the radiator from the second filter 31-4 (the filter 2) to the second open end 31-8 may generate resonance near 1.65 GHz. In addition, when design of the second antenna in the electronic device is shown in FIG. 4A, a radiator from the slot 31-5 to a connection point that connects the rotating shaft 13 to the primary screen frame 12-1 slot may further generate resonance in a 6 GHz band.

The antenna structures according to Embodiment 1 to Embodiment 3 constitute no limitation. In antenna structures according to some other embodiments, the second filter 31-6 may be only disposed on the first metal strip 31-1, or the first filter 32-4 may be only disposed on the second metal strip 31-3, instead of both disposing the second filter 31-6 on the first metal strip 31-1 and disposing the first filter 32-4 on the second metal strip 31-3. In this way, antenna performance of the first metal strip 31-1 can also be improved from different dimensions. For details, refer to related descriptions in FIG. 2B and FIG. 2C.

Embodiment 4

Figure 9A:
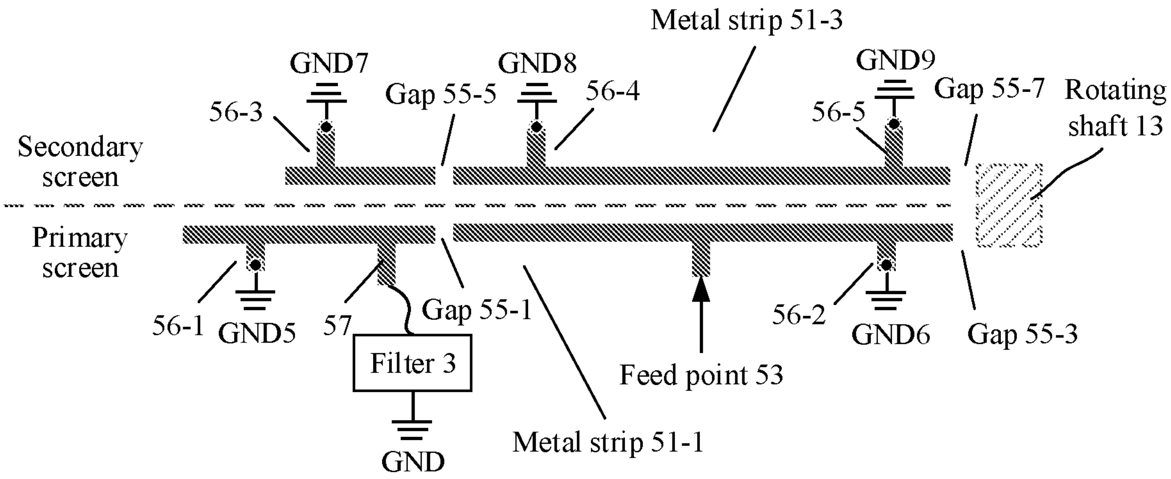
FIG. 9A and FIG. 9B are schematic diagrams of antenna design solutions according to yet another embodiment of this application.
Figure 9B:
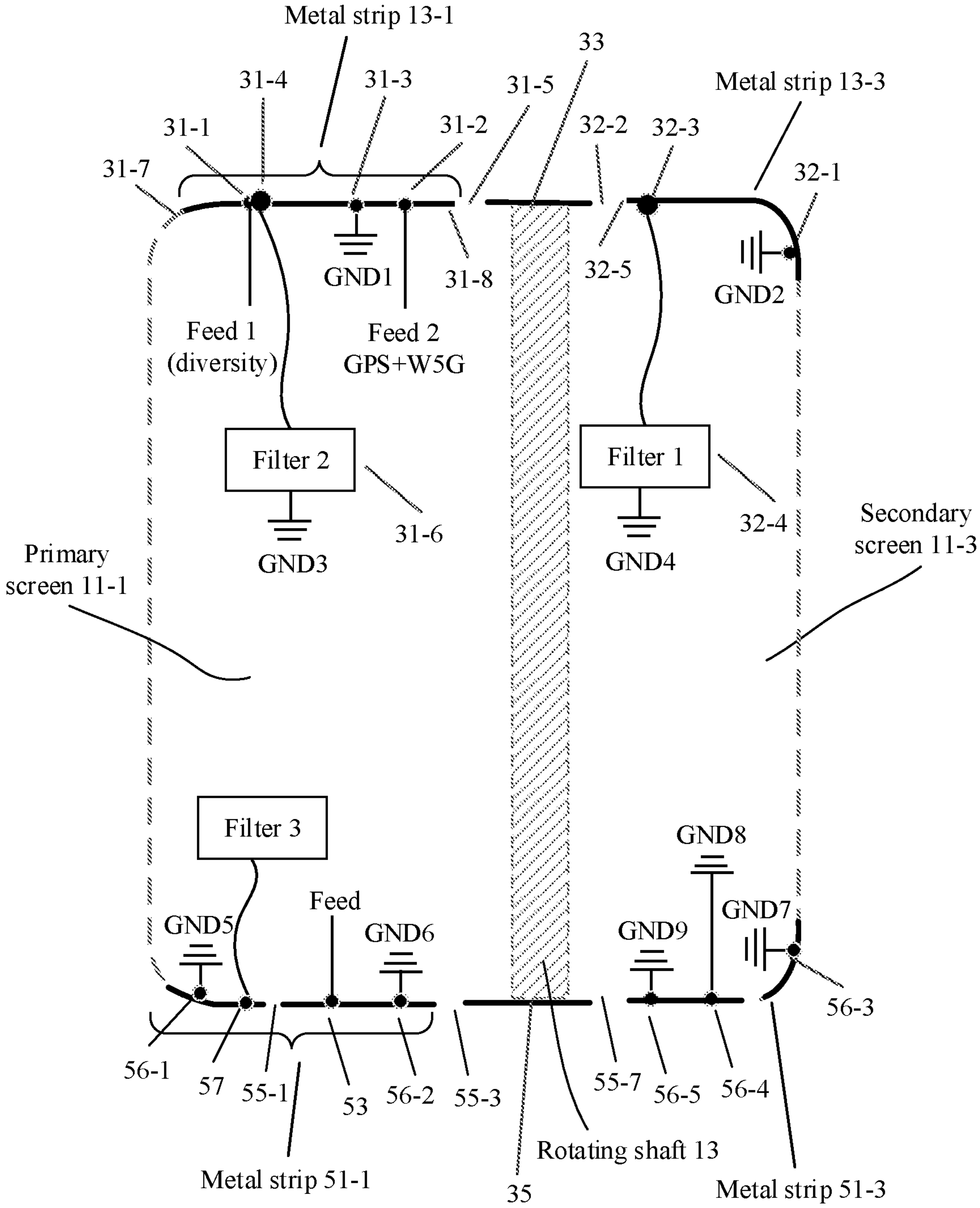

FIG. 9A and FIG. 9B show examples of an antenna structure according to Embodiment 4. FIG. 9A is a simple schematic diagram of the antenna structure, and FIG. 9B shows an architecture of the antenna structure in an electronic device. FIG. 9B also shows an architecture of the antenna structure according to the foregoing embodiment in an electronic device. FIG. 9B constitutes no limitation, and the antenna structure according to Embodiment 4 may also be separately used in an electronic device.

As shown in FIG. 9A and FIG. 9B, the antenna structure may include: a third metal strip 51-1 and a fourth metal strip 51-3. Two ends of the third metal strip 51-1 are open, and a slot 55-1 is disposed on the third metal strip 51-1. A third connection point 57 and a third ground point 56-1 are disposed on one side of the slot 55-1, and a third feed point 53 and a fourth ground point 56-2 are disposed on the other side of the slot 55-1. The third connection point 57 is connected to a third filter. Two ends of the fourth metal strip 51-3 are open, and a slot 55-5 is disposed on the fourth metal strip 51-3. A fifth ground point 56-3 is disposed on one side of the slot 55-5, and a sixth ground point 56-4 and a seventh ground point 56-5 are disposed on the other side of the slot 55-5.

The third metal strip 51-1 may be disposed on the primary screen frame 12-1 close to the other end (which may be referred to as a second end 35) of the rotating shaft 13. The fourth metal strip 51-3 may be disposed on the secondary screen frame 12-3 close to the second end 35 of the rotating shaft 13.

The third feed point 53 performs feeding, so that the third metal strip 51-1 may generate resonance of 1710 to 2700 MHz and resonance of 3300 to 5000 MHz. A ¼ wavelength mode of a radiator from the slot 55-1 to the fourth ground point 56-2 (GND6) may generate resonance of 1700 to 2200 MHz, a ¼ wavelength mode of a radiator from the slot 55-1 to the third ground point 56-1 (GNDS) may generate resonance of 2300 to 2700 MHz, a ¼ wavelength mode of a radiator from the slot 55-1 to the third connection point 57 (connected to a filter 3) may generate resonance of 3300 to 4200 MHz, and a ¾ wavelength mode of a radiator from the slot 55-1 to the fourth ground point 56-2 (GND6) may generate resonance of 4200 to 5000 MHz. When the flexible display 11 is in the folded state, the third metal strip 51-1 may be coupled to the fourth metal strip 51-3, to excite the following three resonance modes: (1) a LOOP resonance mode of a radiator from the sixth ground point 56-4 (GND8) to the seventh ground point 56-5 (GND9) may generate resonance near 3300 MHz; (2) a ¼ wavelength resonance mode of a radiator from the slot 55-5 to the sixth ground point 56-4 (GND8) may generate resonance near 5000 MHz; and (3) a ¼ wavelength resonance mode of a radiator from the slot 55-5 to the fifth ground point 56-3 (GND7) may generate resonance near 2700 MHz or resonance near 5000 MHz. In the foregoing three resonance modes, antenna performance of the third metal strip 51-1 when the flexible display 11 is in the folded state can be improved.

Embodiment 5

Figure 10A:
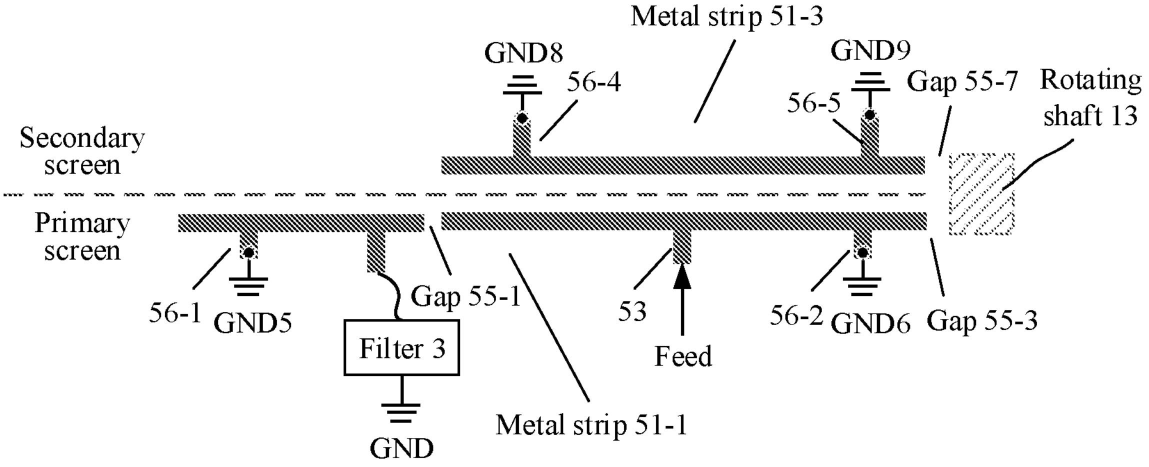
FIG. 10A and FIG. 10B are schematic diagrams of antenna design solutions according to some other embodiments of this application.

FIG. 10A shows an example of an antenna structure according to Embodiment 5. Different from the antenna structure according to Embodiment 4, the fifth ground point 56-3 (GND7) may not be disposed on the fourth metal strip 51-3. In this embodiment, when the flexible display 11 is in the folded state, the third metal strip 51-1 may be coupled to the fourth metal strip 51-3, to excite the following two resonance modes: (1) a LOOP resonance mode of a radiator from the sixth ground point 56-4 (GND8) to the seventh ground point 56-5 (GND9) may generate resonance near 3300 MHz; and (2) a ¼ wavelength resonance mode of a radiator from the slot 55-5 to the sixth ground point 56-4 (GND8) may generate resonance near 5000 MHz.

Embodiment 6

Figure 10B:
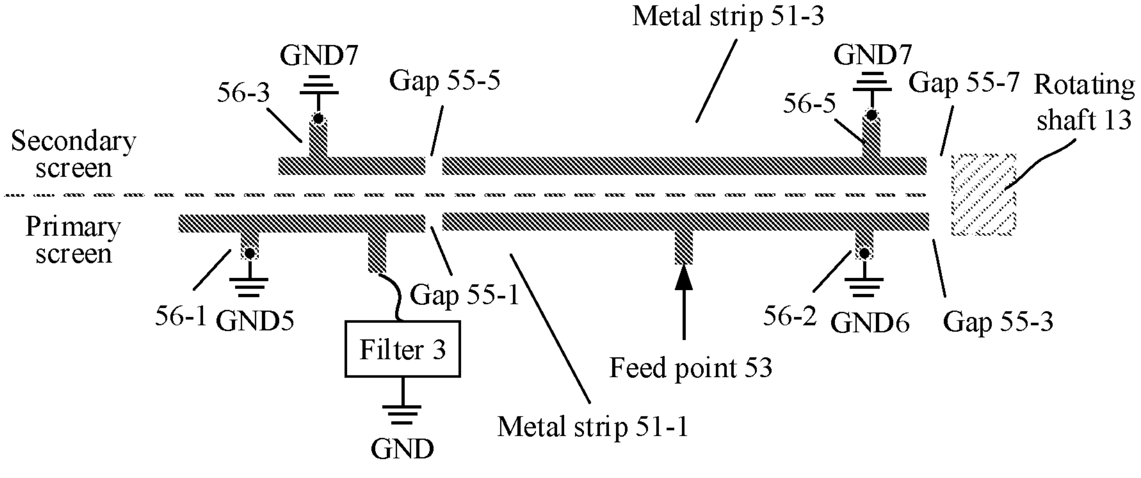

FIG. 10B shows an example of an antenna structure according to Embodiment 6. Different from the antenna structure according to Embodiment 4, the sixth ground point 56-4 (GND8) may not be disposed on the fourth metal strip 51-3. In this embodiment, when the flexible display 11 is in the folded state, the third metal strip 51-1 may be coupled to the fourth metal strip 51-3, to excite the following two resonance modes: (1) a ¼ wavelength resonance mode of a radiator from the slot 55-5 to the sixth ground point 56-4 (GND8) may generate resonance near 5000 MHz; and (2) a ¼ wavelength resonance mode of a radiator from the slot 55-5 to the fifth ground point 56-3 (GND7) may generate resonance near 2700 MHz or resonance near 5000 MHz.

In this application, a wavelength in a wavelength mode (for example, a half wavelength mode) of an antenna may be a wavelength of a signal radiated by the antenna. For example, a half wavelength mode of a floated metal antenna may generate resonance in a 1.575 GHz band, where a wavelength in the half wavelength mode is a wavelength of a signal that is in the 1.575 GHz band and that is radiated by the antenna. It should be understood that a wavelength of a radiated signal in the air may be calculated as follows: wavelength=speed of light/frequency, where the frequency is a frequency of the radiated signal. A wavelength of a radiated signal in a medium may be calculated as follows: wavelength=(speed of light/$\sqrt{\varepsilon}$)/frequency, where $\varepsilon$ is relative permittivity of the medium, and the frequency is a frequency of the radiated signal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna apparatus, comprising:
 a first metal strip configured to be disposed on a first screen frame of a frame of an electronic device, wherein the first metal strip is configured to be disposed closer to a first end of a rotating shaft of the electronic device than to the other end of the rotating shaft, and wherein the first metal strip comprises:
  a first open end;
  a second open end configured to be disposed closer to the first end than the first open end;
  a first feed point;
  a second feed point, wherein the first feed point is disposed closer to the first open end than the second feed point; and
  a first ground point between the first feed point and the second feed point; and
 a second metal strip comprising a third open end and a fourth end and configured to be disposed on a second screen frame of the frame proximate to the first end, wherein the third open end is disposed closer to the first end than the fourth end.

2. The antenna apparatus of claim 1, further comprising:
 a first antenna comprising a first matching circuit and configured to radiate through the first metal strip; and
 a second antenna comprising a second matching circuit and configured to radiate through the first metal strip;
 wherein the first feed point is configured to be coupled to the first matching circuit, and wherein the second feed point is configured to be coupled the second matching circuit.

3. The antenna apparatus of claim 2, wherein when a flexible display of the electronic device is folded at the rotating shaft, the second metal strip is configured to generate radiation in a radiation band of the first antenna via coupling with the first metal strip.

4. The antenna apparatus of claim 1, wherein the ether fourth end is grounded.

5. The antenna apparatus of claim 1, further comprising a first connection point and a first filter, wherein the first connection point is disposed on the second metal strip and is coupled to the first filter.

6. The antenna apparatus of claim 1, wherein the first metal strip is configured to form a metal frame segment between a first slot and a second slot of the first screen frame.

7. The antenna apparatus of claim 1, wherein the second metal strip is configured to form a metal frame segment between a slot and a ground point of the second screen frame.

8. The antenna apparatus of claim 1, wherein a length of the first metal strip is greater than or equal to a length of the second metal strip.

9. The antenna apparatus of claim 1, wherein further comprising a connection point and a filter, wherein the connection point is disposed on the first metal strip and is coupled to the filter.

10. The antenna apparatus of claim 9, wherein the connection point and the first feed point comprises a same point on the first metal strip.

11. The antenna apparatus of claim 10, further comprising an antenna comprising a matching circuit, wherein the filter is comprised in the matching circuit.

12. An electronic device, comprising:
- a rotating shaft comprising a first end and a second end;
- a flexible display comprising a first screen and a second screen respectively configured on two sides of the rotating shaft and configured to be folded at the rotating shaft;
- a frame comprising a first screen frame and a second screen frame; and
- an antenna apparatus, comprising:
  - a first metal strip disposed on the first screen frame closer to the first end than to the second end, and comprising:
    - a first open end;
    - a second open end disposed closer to the first end of the rotating shaft than the first open end;
    - a first feed point;
    - a second feed point, wherein the first feed point is disposed closer to the first open end than the second feed point; and
    - a first ground point located between the first feed point and the second feed point; and
  - a second metal strip disposed on the second screen frame closer to the first end than to the second end and comprising a third open end that is disposed closer to the first end than a fourth end of the second metal strip.

13. The electronic device of claim 12, wherein the antenna apparatus further comprising:
- a first antenna comprising a first matching circuit, the first antenna radiates through the first metal strip;
- a second antenna comprising a second matching circuit, the second antenna radiates through the first metal strip;
- a first matching circuit coupled to the first feed point; and
- a second matching circuit coupled to the second feed point.

14. The electronic device of claim 13, wherein when the flexible display is folded at the rotating shaft, the second metal strip is configured to generate radiation in a radiation band of the first antenna via coupling with the first metal strip.

15. The electronic device of claim 12, wherein the fourth end is grounded.

16. The electronic device of claim 12, wherein the antenna apparatus further comprising a first filter coupled to a first connection point that is located on the second metal strip.

17. The electronic device of claim 12, wherein the first screen frame is a metal frame and includes a first slot and a second slot, and wherein the first metal strip is formed of a first metal frame segment of the metal frame that is located between the first slot and the second slot.

18. The electronic device of claim 12, wherein the second screen frame is a metal frame and includes a second ground point and a slot, and wherein the second metal strip is formed of a second metal frame segment of the metal frame that is located between the fourth slot and the second ground point.

19. The electronic device of claim 12, wherein a length of the first metal strip is greater than or equal to a length of the second metal strip.

20. The electronic device of claim 12, wherein the antenna apparatus further comprises a filter coupled to a connection point disposed on the first metal strip.

* * * * *